United States Patent
Ganschow et al.

(10) Patent No.: US 11,792,483 B2
(45) Date of Patent: Oct. 17, 2023

(54) METHOD AND SYSTEM FOR PROVIDING INTERACTIVE CONTENT DELIVERY AND AUDIENCE ENGAGEMENT

(71) Applicant: StreamLayer Inc., Chicago, IL (US)

(72) Inventors: Tim Ganschow, Chicago, IL (US); John Ganschow, Chicago, IL (US)

(73) Assignee: STREAMLAYER, INC., Chicago, IL (US)

(*) Notice: Subject to any disclaimer, the term of this patent is extended or adjusted under 35 U.S.C. 154(b) by 0 days.

(21) Appl. No.: 17/024,631

(22) Filed: Sep. 17, 2020

(65) Prior Publication Data
US 2021/0076099 A1 Mar. 11, 2021

Related U.S. Application Data

(63) Continuation-in-part of application No. 16/725,095, filed on Dec. 23, 2019, and a continuation-in-part of application No. 29/706,035, filed on Sep. 17, 2019.
(Continued)

(51) Int. Cl.
*H04N 21/431* (2011.01)
*H04N 21/472* (2011.01)
(Continued)

(52) U.S. Cl.
CPC ..... *H04N 21/47214* (2013.01); *G06F 3/0482* (2013.01); *G06F 21/44* (2013.01);
(Continued)

(58) Field of Classification Search
None
See application file for complete search history.

(56) References Cited

U.S. PATENT DOCUMENTS 6,654,032 B1 11/2003 Zhu et al.
D611,498 S 3/2010 Alvarez
(Continued)

FOREIGN PATENT DOCUMENTS

CN 303612434 S 3/2016
CN 303906801 11/2016
(Continued)

OTHER PUBLICATIONS

International Search Report and Written Opinion dated Apr. 1, 2020 for PCT/US2019/068369.
(Continued)

*Primary Examiner* — Jefferey F Harold
*Assistant Examiner* — Charles N Hicks
(74) *Attorney, Agent, or Firm* — Suiter Swantz pc llo

(57) ABSTRACT

A method is disclosed. The method includes receiving one or more video program streams from one or more video provider servers, the one or more video program streams associated with one or more video programs; displaying at least one video program of the one or more video programs on a graphical user interface of a user device; generating one or more control signals configured to cause the user device to display a first interactive content including an active contacts indicator button, the active contacts indicator button configured to display a number of contacts which are online; and generating one or more control signals configured to cause the user device to display a second interactive content overlay in response to a user selection of the active contacts indicator button, the second interactive content overlay being configured to display a contacts overlay including a list of one or more contacts.

20 Claims, 24 Drawing Sheets

Related U.S. Application Data

(60) Provisional application No. 62/901,680, filed on Sep. 17, 2019, provisional application No. 62/784,261, filed on Dec. 21, 2018.

(51) Int. Cl.
  *H04N 21/4722* (2011.01)
  *G06F 3/0482* (2013.01)
  *H04N 21/44* (2011.01)
  *G06F 21/44* (2013.01)
  *H04N 21/441* (2011.01)

(52) U.S. Cl.
  CPC .......... *H04N 21/431* (2013.01); *H04N 21/44* (2013.01); *H04N 21/441* (2013.01); *H04N 21/4722* (2013.01)

(56) References Cited

U.S. PATENT DOCUMENTS

| | | |
|---|---|---|
| D615,546 S | 5/2010 | Lundy et al. |
| 8,301,618 B2 | 10/2012 | Allard |
| D673,172 S | 12/2012 | Peters et al. |
| 8,434,103 B2 | 4/2013 | Tsuchida et al. |
| D682,304 S | 5/2013 | Mierau et al. |
| D693,361 S | 11/2013 | Arnold et al. |
| D701,516 S | 3/2014 | Jaini |
| D706,806 S | 6/2014 | Nishizawa |
| D707,250 S | 6/2014 | Fernandes |
| 8,856,817 B2 | 10/2014 | Sinha et al. |
| D724,616 S | 3/2015 | Jou |
| D730,918 S | 6/2015 | Park et al. |
| D735,221 S | 7/2015 | Mishra et al. |
| D738,385 S | 9/2015 | Lim et al. |
| 9,122,365 B2 | 9/2015 | Lee et al. |
| D741,353 S | 10/2015 | Anzures et al. |
| D749,112 S | 2/2016 | Coburn et al. |
| D759,705 S | 6/2016 | Arroyo et al. |
| D762,714 S | 8/2016 | Choi et al. |
| D765,137 S | 8/2016 | Moriya |
| 9,414,130 B2 | 8/2016 | Coan et al. |
| D766,298 S | 9/2016 | Bae et al. |
| 9,467,750 B2 | 10/2016 | Banica et al. |
| D774,078 S | 12/2016 | Kisselev et al. |
| D774,530 S | 12/2016 | Clement et al. |
| D776,147 S | 1/2017 | Simmons et al. |
| 9,557,878 B2 | 1/2017 | Chen et al. |
| 9,591,372 B2 | 3/2017 | Walker et al. |
| D788,137 S | 5/2017 | Zhu et al. |
| D789,393 S | 6/2017 | Jaini et al. |
| D789,976 S | 6/2017 | Gibson et al. |
| D790,563 S | 6/2017 | Lam |
| 9,743,153 B2 | 8/2017 | Holyoak |
| 9,762,967 B2 | 9/2017 | Clarke et al. |
| D804,505 S | 12/2017 | Hoffman et al. |
| D805,101 S | 12/2017 | Zhao et al. |
| D807,914 S | 1/2018 | Clement et al. |
| 9,875,489 B2 | 1/2018 | Spitz et al. |
| D814,506 S | 4/2018 | Porter |
| D815,124 S | 4/2018 | Mariet et al. |
| D815,128 S | 4/2018 | Phillips et al. |
| D815,131 S | 4/2018 | Thompson et al. |
| D816,708 S | 5/2018 | Riedel et al. |
| D818,477 S | 5/2018 | Hoffman et al. |
| D823,338 S | 7/2018 | Ruiz et al. |
| 10,025,453 B2 | 7/2018 | Masuda et al. |
| D826,961 S | 8/2018 | Lider et al. |
| D828,375 S | 9/2018 | Mok et al. |
| D831,059 S | 10/2018 | Bao |
| D834,049 S | 11/2018 | Cinek et al. |
| D842,868 S | 3/2019 | Seong et al. |
| D847,160 S | 4/2019 | Laflamme |
| D847,824 S | 5/2019 | Toth |
| D849,027 S | 5/2019 | Rocha et al. |
| D850,480 S | 6/2019 | Zhang et al. |
| D852,214 S | 6/2019 | Westerhold et al. |
| D852,215 S | 6/2019 | Westerhold et al. |
| D856,347 S | 8/2019 | Cinek et al. |
| D857,724 S | 8/2019 | Clediere et al. |
| D857,738 S | 8/2019 | Jou |
| D858,552 S | 9/2019 | Westerhold et al. |
| D858,559 S | 9/2019 | Kim et al. |
| D859,442 S | 9/2019 | Zhang et al. |
| D859,450 S | 9/2019 | Krishna |
| D861,025 S | 9/2019 | Stukalov et al. |
| D870,141 S | 12/2019 | Bowden et al. |
| D875,757 S | 2/2020 | Feng et al. |
| D878,410 S | 3/2020 | Eu et al. |
| D879,806 S | 3/2020 | Fatnani et al. |
| D879,818 S | 3/2020 | Evans et al. |
| D881,219 S | 4/2020 | Ngo et al. |
| D881,220 S | 4/2020 | Feng et al. |
| D885,412 S | 5/2020 | Alvarez et al. |
| D885,421 S | 5/2020 | Lunaparra et al. |
| D892,839 S | 8/2020 | Hansen et al. |
| D894,951 S | 9/2020 | Krishna |
| D896,831 S | 9/2020 | Honnette et al. |
| D899,436 S | 10/2020 | Lider et al. |
| D904,449 S | 12/2020 | Amini et al. |
| D914,034 S | 3/2021 | Lee et al. |
| D924,251 S | 7/2021 | Kim et al. |
| 11,102,178 B2 | 8/2021 | Ding et al. |
| D933,696 S | 10/2021 | Underwood et al. |
| D934,285 S | 10/2021 | Underwood et al. |
| D935,483 S | 11/2021 | Harris et al. |
| D938,985 S | 12/2021 | Kwak |
| D939,564 S | 12/2021 | Kwak et al. |
| 11,209,961 B2 | 12/2021 | Pope et al. |
| D944,282 S | 2/2022 | Underwood et al. |
| 11,245,785 B2 | 2/2022 | Shuttleworth et al. |
| D944,848 S | 3/2022 | Underwood et al. |
| D947,233 S | 3/2022 | Ganschow et al. |
| D949,909 S | 4/2022 | Paul |
| D951,267 S | 5/2022 | Ganschow et al. |
| D955,414 S | 6/2022 | Tompkins et al. |
| D956,771 S | 7/2022 | Haggerty et al. |
| D963,689 S | 9/2022 | Fang et al. |
| D974,376 S | 1/2023 | Zhu |
| D978,165 S | 2/2023 | Wang |
| D978,183 S | 2/2023 | Lee |
| 2002/0054088 A1* | 5/2002 | Tanskanen ............ G06Q 40/04 348/E7.071 |
| 2003/0115595 A1 | 6/2003 | Stevens et al. |
| 2003/0157976 A1 | 8/2003 | Simon et al. |
| 2004/0229568 A1 | 11/2004 | Lowe et al. |
| 2008/0195969 A1 | 8/2008 | Brown et al. |
| 2009/0031431 A1 | 1/2009 | Boccon-Gibod |
| 2009/0083668 A1 | 3/2009 | Aizawa et al. |
| 2009/0125332 A1 | 5/2009 | Martin |
| 2009/0217320 A1 | 8/2009 | Aldrey |
| 2010/0319043 A1 | 12/2010 | Jain et al. |
| 2011/0078023 A1 | 3/2011 | Aldrey et al. |
| 2011/0169959 A1 | 7/2011 | DeAngelis et al. |
| 2011/0289317 A1 | 11/2011 | Darapu et al. |
| 2011/0289421 A1 | 11/2011 | Jordan et al. |
| 2012/0185886 A1 | 7/2012 | Charania et al. |
| 2013/0007807 A1 | 1/2013 | Grenville et al. |
| 2013/0290861 A1 | 10/2013 | Chen et al. |
| 2013/0332850 A1 | 12/2013 | Bovet et al. |
| 2014/0075361 A1 | 3/2014 | Reynolds et al. |
| 2014/0229992 A1 | 8/2014 | Ellis et al. |
| 2014/0282670 A1 | 9/2014 | Sinha et al. |
| 2015/0015500 A1 | 1/2015 | Lee et al. |
| 2015/0026718 A1 | 1/2015 | Seyller |
| 2015/0088622 A1 | 3/2015 | Ganschow |
| 2015/0106748 A1 | 4/2015 | Monte et al. |
| 2015/0121278 A1 | 4/2015 | Kim et al. |
| 2015/0248389 A1 | 9/2015 | Kahn et al. |
| 2015/0319493 A1 | 11/2015 | Lynch |
| 2015/0319506 A1 | 11/2015 | Kansara et al. |
| 2016/0062639 A1 | 3/2016 | Hwang et al. |
| 2016/0358406 A1 | 12/2016 | Daly |
| 2016/0366464 A1* | 12/2016 | Rouady ............ H04N 21/4312 |
| 2016/0372086 A1 | 12/2016 | Khinchuk |

(56) References Cited

U.S. PATENT DOCUMENTS

| | | | |
|---|---|---|---|
| 2017/0034237 | A1 | 2/2017 | Silver |
| 2017/0041648 | A1 | 2/2017 | Dalrymple et al. |
| 2017/0140505 | A1 | 5/2017 | Gueniot |
| 2017/0195745 | A1 | 7/2017 | Bvn et al. |
| 2017/0287443 | A1 | 10/2017 | Boyce |
| 2017/0339462 | A1 | 11/2017 | Clarke et al. |
| 2017/0366856 | A1 | 12/2017 | Riegel et al. |
| 2018/0249206 | A1 | 8/2018 | Drori |
| 2018/0300018 | A1 | 10/2018 | Masuda et al. |
| 2018/0316948 | A1 | 11/2018 | Todd |
| 2019/0058682 | A1 | 2/2019 | MacAskill et al. |
| 2019/0076741 | A1* | 3/2019 | Thompson ....... H04N 21/25891 |
| 2019/0335209 | A1* | 10/2019 | Birrer ............ H04N 21/234327 |
| 2020/0245017 | A1 | 7/2020 | Ganschow et al. |
| 2021/0031105 | A1 | 2/2021 | Ganschow et al. |
| 2021/0076099 | A1 | 3/2021 | Ganschow et al. |
| 2021/0255826 | A1 | 8/2021 | Devine et al. |

FOREIGN PATENT DOCUMENTS

| | | |
|---|---|---|
| CN | 304839205 | 10/2018 |
| EP | 3270343 A1 | 1/2018 |
| WO | 2012027594 A2 | 3/2012 |
| WO | 2014183034 A1 | 11/2014 |
| WO | 2017117422 A1 | 7/2017 |
| WO | 2020132682 A1 | 6/2020 |

OTHER PUBLICATIONS

Skelton, Nick, "Share Your App content smoothly using Firebase Dynamic Links", Apr. 6, 2018, https://medium.com/a-practical-guide-to-firebase-on-android/share-your-app-content-smoothly-using-firebase-dynamic-links-82b9ec999189.

U.S. Appl. No. 29/686,931, filed Apr. 9, 2019, Tim Ganschow.

3 Best android video player apps, https://web.archive.orgfweb/20170825192525/https://www.guitricks.com/2014/12/3-video-players-which-are-best-for.html (Year: 2017).

IPhone X Plus will have iPad-like landscape UI, https://www.gsmarena.com/iphone_x_plus_will_have_ipadlike_landscape_ui-news- 32551.php (Year: 2018).

Mobile vs Tablet User Interface Design—Ashwini, https://www.cognitiveclouds.com/insights/ mobile-vs-tablet-user-interface-ui-design-key-differences-explained/ (Year: 2017).

Stan, M. "(2013) Sidebar Animation (GIF)." Dribbble, published Sep. 11, 2013 (Retrieved from the Internet Dec. 2, 2021). Internet URL: (Year:2013).

International Search Report and Written Opinion in European Application No. 19898273.8 dated Jul. 27, 2022.

7 Best live stream apps for Android—Fedewa, https://phandroid.com/2016/12/13/best-live-stream-apps-android/ (Year:2016).

Best live streaming apps—CNET, https://www.youtube.com/watch?v=ROdbtdckb18 (Year:2016).

Zuckerberg Really Wants You to StreamLive Video on Facebook—WIRED, https://www.wired.com/2016/04/facebook-really-wants-broadcast-watch-live-video/ (Year:2016).

Japanese Refusal dated Jan. 13, 2023; Japanese Application No. DM/212757, p. 20.

"CSS: border-radius and -moz-border-radius." The Art of Web, published Feb. 7, 2010 (Retrieved from the Internet Jul. 27, 2020). Internet URL: (Year: 2010).

"React Carousel Image Gallery." React JS Example, published May 30, 2018 (Retrieved from the Internet Mar. 6, 2023). Internet URL: (Year; 2018).

Shi, Charity. "Concept: Browsing Facebook Videos on TV." Charityshi.com, published Mar. 2, 2018 (Retrieved from the Internet Mar. 6, 2023). Internet URL: (Year: 2018).

Extended European Search Report dated Apr. 17, 2023; European Application No. 20864795.8.

Extended European Search Report dated Jul. 19, 2023; European Application No. 20875701.3.

* cited by examiner

METHOD AND SYSTEM FOR PROVIDING INTERACTIVE CONTENT DELIVERY AND AUDIENCE ENGAGEMENT

CROSS-REFERENCE TO RELATED APPLICATIONS

The present application is a continuation-in-part application of U.S. Non-Provisional patent application Ser. No. 16/725,095 filed on Dec. 23, 2019, published on Jul. 30, 2020 as U.S. Patent Publication Number 2020/0245017, which claims the benefit of U.S. Provisional Patent Application Ser. No. 62/784,261, filed on Dec. 21, 2018; the present application also claims the benefit of U.S. Provisional Patent Application Ser. No. 62/901,680, filed on Sep. 17, 2019; the present application also claims the benefit of U.S. Design patent application Ser. No. 29/706,035, filed on Sep. 17, 2019, whereby the above-listed patent applications are incorporated herein by reference in the entirety.

TECHNICAL FIELD

The present disclosure relates to an interactive content delivery and interactive engagement platform, in particular, a software platform permitting video viewing with simultaneous real-time interaction with ancillary content within a video viewing application on any mobile computing, over-the-top (OTT) video content viewing devices, or other electronic devices capable of displaying internet-delivered video content.

BACKGROUND

Delivery of video content can be accomplished over the Internet by video streaming live and on-demand events, news, movies, and cable and traditional network television programming. Experiencing video content while simultaneously communicating and interacting with other individuals regarding the video media content often is preferable to experiencing the video media content alone. Frequently, however, an end-user is unable to be accompanied by other end-users while watching video media content and thus is relegated to watching the video programming alone.

Similarly, experiencing video content delivered over the Internet while simultaneously accessing additional information and services related to the video content such as commentary from experts or friends, sports statistics, social media feeds, betting on sports, etc. —both proprietary and from third-party sources—related to the video content often is preferable to experiencing only the video content itself. Frequently however, when an individual is watching video content via a mobile device, there is not a way to simultaneously access additional related information without exiting the video, thus disrupting the user experience.

Internet-based video platforms that deliver video content to mobile-video content providing applications and over-the-top (OTT) video content viewing devices hope to attract end-users/audiences by delivering an engaging video viewing experience. However, internet-based video platforms fail to provide the necessary interface and back-end infrastructure permitting end-users to view video content while simultaneously engaging in those activities that make video viewing more enjoyable because of the cost of designing, building and maintaining the necessary additional functionality. As a result, their viewers are not able to simultaneously view video content while engaging in activities such as communicating and interacting with friends or other end-users, accessing direct and third-party information and services related to the content, and accessing commerce related to the video content. These platforms thus not only fail to enhance the end-user experience and promote audience traffic to their platforms by providing a more immersive, engaging viewing experience, but they lose end-users/audiences over the course of the video event due to end-users exiting the video experience completely in order to open other applications in order to communicate with friends, family and other end-users, access information and services related to the video content, or engage in commerce related to the video content. This is especially true for mobile video platforms.

These internet-based video content providing applications also frequently contain disruptive advertising that delivers a negative experience to the viewer because they are forced to view the advertising instead of the video content. Or, the advertising removes the viewer from the video content providing application and places them on the advertising product's website, or encourages them to leave the application and visit the web site. This results in the loss of end-users as individuals either exit the experience because of frustration with the advertising, or because the advertising has launched a separate web browser outside the video experience that pushes the end-user from the experience, or both.

Some dedicated internet-based video content providing applications create interactive environments where end-users/audiences can communicate and interact while simultaneously viewing content. And other dedicated mobile video platforms enable end-user/audiences to access related content, specifically sports statistics, while simultaneously viewing content. These platforms, however, are purpose-built, dedicated applications and not designed to be transferable, software-as-a-service (SaaS) experiences for third parties. Additionally, none provide seamless interfaces to enable end-users to easily place bets, especially fast-repeating bets, while watching video content, nor do they provide the means to easily track their active bets while watching the video content. Finally, none of these platforms provide for the ability to engage with other users in real-time active video game experiences directly tied to the video content streamed and viewed in real time.

Some external third-party communications applications, such as instant messenger, Facebook Messenger, or Gmail's chat program, can be used to communicate via mobile devices. Furthermore, other external communications companies enable messaging functionality to be added to third-party mobile applications. However, none of these communication applications enable separate third-party video content providing application owners to provide the end-user/audience with the ability to communicate with other individuals in the video content providing application while simultaneously watching video content. Additionally, none of these communication applications provide the end-user/audience with the ability to see who among their friends is watching the same or similar content, nor do they make it easy to facilitate social interactions with these friends while simultaneously watching video content. None of these communications applications enable the end-user/audience to watch video content while simultaneously accessing additional information and services related to the video content, including from third-party sources, in the video content providing application. Furthermore, none of these communication applications facilitate the sharing of this content while simultaneously watching video content.

Additionally, these third-party communications applications do not allow the owners of video content to insert advertising inventory integrated into the interface permitting end-users to view the video content while simultaneously engaging with ancillary content and services in order to maximize the value of the increased engagement from these content and services with the end-user/audiences. These third-party communications platforms also do not provide advertising directly tied to in-game activities to create unique marketing experiences based on exciting game-related accomplishments. Finally, these third-party communications platforms do not provide detailed engagement statistics to the video content owner detailing how communications were sent or information accessed while the end-user/audiences watched the video content and engaged with other content or services.

Therefore, it would be desirable to provide a system and method which cure one or more of the shortfalls of previous approaches identified above.

SUMMARY

A system for interactive video content is disclosed, in accordance with one or more embodiments of the present disclosure. In one embodiment, the system includes one or more interactive engagement platform servers communicatively couplable to a plurality of user devices, the plurality of user devices being configured to display one or more video programs via one or more video program streams received from one or more video provider servers, the one or more interactive engagement platform servers being configured to: identify one or more user devices of the plurality of user devices authenticated to a specific Client ID; identify one or more user devices of the plurality of user devices subscribed to the specific Client ID; identify one or more user devices of the plurality of user devices subscribed to a specific Event ID; determine if a stored contact list within one or more registration servers matches the specific Client ID and the specific Event ID; transmit one or more data payloads identifying the matching specific Client ID and the specific Event ID to the one or more identified user devices; generate one or more control signals configured to cause the one or more identified user devices to display a first interactive content overlay configured to display information associated to the one or more data payloads; and generate one or more control signals in response to a user selection of the first interactive content overlay, the one or more control signals configured to cause the one or more identified user devices to display a second interactive content overlay including a list of one or more contacts.

A system for interactive video content is disclosed, in accordance with one or more embodiments of the present disclosure. In one embodiment, the system includes a user device communicatively coupled to one or more video provider servers and at least one of one or more third-party service providers or one or more third-party content providers, the user device being configured to: receive one or more video program streams from the one or more video provider servers, the one or more video program streams associated with one or more video programs; display at least one video program of the one or more video programs on a graphical user interface of the user device; display a first interactive content overlay including an active contacts indicator button, the active contacts indicator button configured to display a number of contacts which are online; and display a second interactive content overlay within the graphical user interface in response to a user selection of the active contacts indicator button of the first interactive content overlay, the second interactive content overlay being configured to display a contacts overlay including a list of one or more contacts.

A method is disclosed, in accordance with one or more embodiments of the present disclosure. In one embodiment, the method includes receiving one or more video program streams from one or more video provider servers, the one or more video program streams associated with one or more video programs. In another embodiment, the method includes displaying at least one video program of the one or more video programs on a graphical user interface of a user device. In another embodiment, the method includes generating one or more control signals configured to cause the user device displaying the at least one video program to display a first interactive content including an active contacts indicator button, the active contacts indicator button configured to display a number of contacts which are online. In another embodiment, the method includes generating one or more control signals configured to cause the user device to display a second interactive content overlay within the graphical user interface in response to a user selection of the active contacts indicator button of the first interactive content overlay, the second interactive content overlay being configured to display a contacts overlay including a list of one or more contacts.

A system for interactive video content is disclosed, in accordance with one or more embodiments of the present disclosure. In one embodiment, the system includes one or more interactive engagement platform servers communicatively couplable to a plurality of user devices, the plurality of user devices being configured to display one or more video programs via one or more video program streams received from one or more video provider servers, the one or more interactive engagement platform servers being configured to: identify one or more user devices of the plurality of user devices subscribed to a specific Event ID; transmit one or more data payloads to the one or more identified user devices subscribed to the specific Event ID; generate one or more control signals in response to a user selection to cause the one or more identified user devices to display a first interactive content overlay; retrieve a data packet from one or more third party service providers; generate one or more control signals configured to cause the one or more identified user devices to display a second interactive content overlay including information associated with the retrieved data packet, the information associated with the retrieved data packet including a list of one or more betting type opportunities; retrieve an additional data packet from the one or more identified user devices in response to a user selection of a bet from the list of one or more betting type opportunities; transmit to the user selection of the bet to at least one of the one or more third party service providers; retrieve from the at least one of the one or more third party service providers a result of the user selected bet; and generate one or more control signals configured to cause the one or more identified user devices to display a third interactive content overlay including the result of the user selected bet.

A system for interactive video content is disclosed, in accordance with one or more embodiments of the present disclosure. In one embodiment, the system includes a user device communicatively coupled to one or more video provider servers and at least one of one or more third-party service providers or one or more third-party content providers, the user device being configured to: receive one or more video program streams from the one or more video provider servers, the one or more video program streams associated with one or more video programs; display at least one video program of the one or more video programs on a graphical user interface of the user device; display an interactive betting content overlay including a list of one or more betting opportunity types on a graphical user interface of the user device; display a repeatable interactive betting overlay on the graphical user interface in response to a user selection of at least one of one or more betting opportunity types from the list of one or more betting opportunity types, the repeatable bet overlay configured to display one or more bets associated with a repeatable bet, the repeatable interactive betting overlay further configured to display one or more wagering amounts corresponding to the one or more bets; and generate one or more control signals configured to lock-in the one or more bets with a third-party service provider in response to a user selection of the one or more bets and the one or more wagering amounts.

A method is disclosed, in accordance with one or more embodiments of the present disclosure. In one embodiment, the method includes generating one or more control signals configured to cause a user device displaying a video program to display an interactive betting content overlay including a list of one or more betting opportunity types on a graphical user interface of a user device. In another embodiment, the method includes generating one or more control signals configured to cause the user device displaying the video program to display a repeatable bet overlay within the graphical user interface in response to a user selection of at least one of one or more betting opportunity types from the list of one or more betting opportunity types, the repeatable bet overlay configured to display one or more bets associated with a repeatable bet, the repeatable bet overlay further configured to display one or more wagering amounts corresponding to the one or more bets. In another embodiment, the method includes generating one or more control signals configured to lock-in the one or more bets with a third-party bet service provider in response to a user selection of the one or more bets and the one or more wagering amounts.

A system for interactive video content is disclosed, in accordance with one or more embodiments of the present disclosure. In one embodiment, the system includes one or more interactive engagement platform servers communicatively couplable to a plurality of user devices, the plurality of user devices being configured to display one or more video programs via one or more video program streams received from one or more video provider servers, the one or more interactive engagement platform servers being configured to: generate one or more control signals configured to cause the plurality of user devices to display an interactive bet tracking content overlay in response to a user selection of an additional interactive content overlay; retrieve a data query containing one or more parameters of one or more bets, the data query further containing device ID information of the plurality of user devices; transmit the retrieved data query to one or more third party service providers; retrieve a data packet from at least one of the one or more third party service providers; generate one or more control signals configured to cause the plurality of user devices to display the interactive bet tracking content overlay configured to display information associated with the retrieved data packet; identified one or more user devices of the plurality of user devices subscribed to a specific service provider of the one or more third party service providers; transmit one or more data payloads to the one or more identified user devices subscribed to the specific service provider; retrieve an additional data packet including one or more results of the one or more bets from at least one of the one or more third party service providers, and generate one or more control signals configured to cause the one or more identified user devices to display the interactive bet tracking content overlay configured to display information associated with the retrieved additional data packet, the information associated with the retrieved additional data packing include the one or more results of the one or more bets.

A system for interactive video content is disclosed, in accordance with one or more embodiments of the present disclosure. In one embodiment, the system includes a user device communicatively coupled to one or more video provider servers and at least one of one or more third-party service providers or one or more third-party content providers, the user device being configured to: display one or more interactive bet tracking content overlays in response to a user selection, the one or more interactive bet tracking content overlays including one or more values associated with one or more active bets, the one or more interactive bet tracking content overlays further including an indication regarding a current state of the one or more active bets.

A method is disclosed, in accordance with one or more embodiments of the present disclosure. In one embodiment, the method includes generating one or more control signals configured to cause a user device displaying a video program to display an interactive bet tracking content overlay on a graphical user interface of a user device, the interactive bet tracking content overlay including one or more values associated with one or more active bets, the one or more interactive bet tracking content overlays further including an indication regarding a current state of the one or more active bets.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
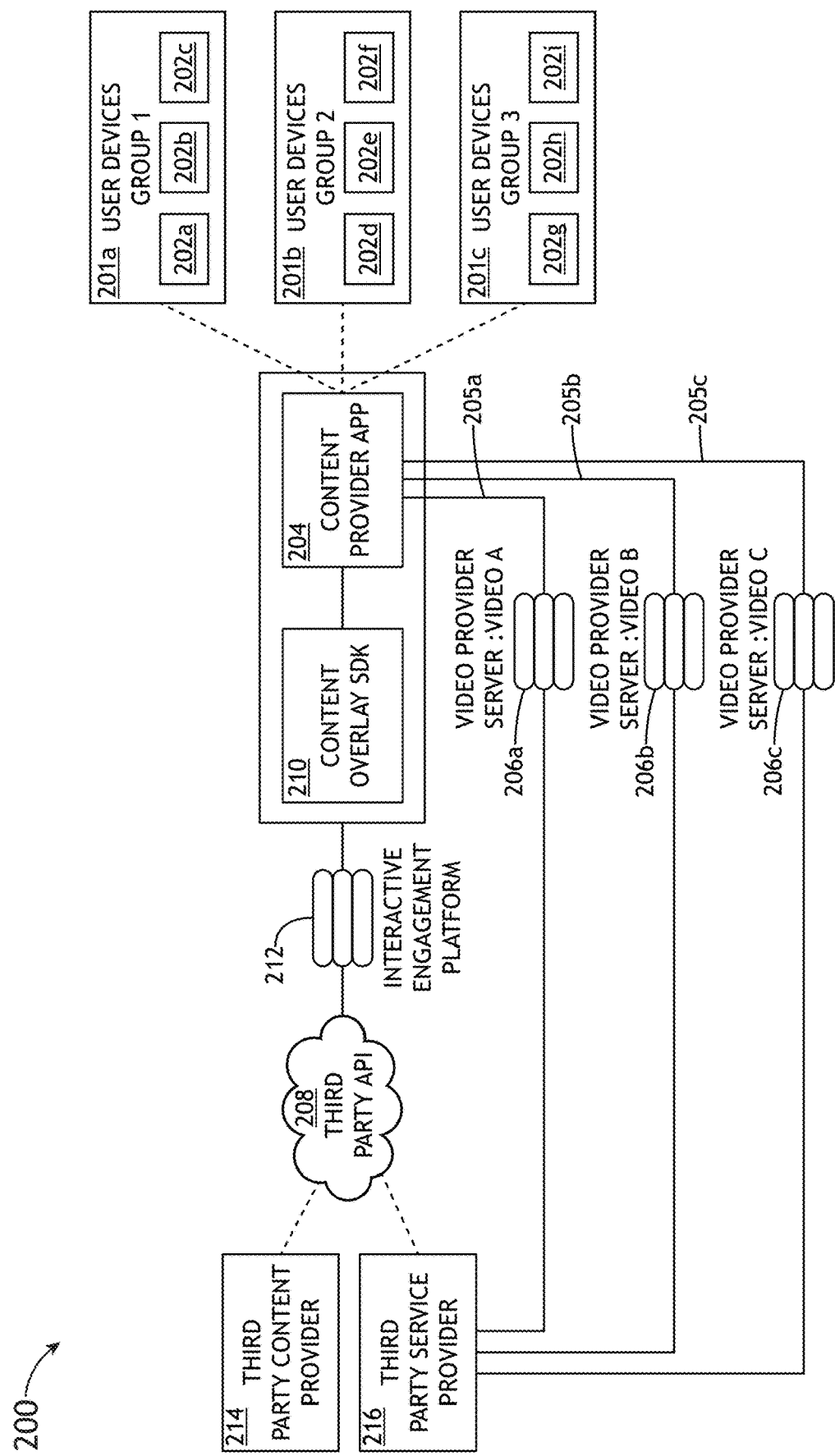
FIG. 1A illustrates a simplified block diagram of a video content system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

The present disclosure relates to a social engagement software platform for internet-based video content providing applications on mobile computing user devices, (e.g., smartphones, tablets, e-book readers, laptops, and the like), over-the-top (OTT) video content systems (e.g., Apple TV, Roku, Internet-connected TVs, and the like). It is contemplated herein that the social engagement software platform may provide interactive content overlay on user devices for both live and on-demand video content. For the purposes of the present disclosure, it should be understood that video content providing applications may include native video content applications, web-based video content applications, and hybrid video content applications. Likewise, in addition to OTT systems (e.g., Apple TV, Roku, Internet-connected TVs, and the like) and mobile user devices, it should be understood that various other types of electronic devices that are capable of displaying video content (including in virtual and augmented reality formats) can be used in accordance with various embodiments discussed herein.

Embodiments of the present disclosure are directed to an interactive engagement platform of a video content system which users of video content may view the video content while simultaneously viewing, interacting, or communicating with other information and/or users in an interactive content overlay. Users may be capable of interacting with other users/audiences who are watching the same and/or different video content. The interactive content overlay of the present disclosure may be implemented in any video content providing applications capable of displaying internet-delivered video content. The interactive engagement platform also allows an end-user to watch video content while simultaneously accessing and viewing additional information related to the video content, conduct transactions related to the video content (e.g., purchasing products and services, wagering, etc.), and view advertising without leaving the video content providing application.

It is noted herein that many video content providers provide video content to users via an application-based system. For example, a user may view sports-related content provided by Entertainment and Sports Programming Network (ESPN) through the web-based ESPN application, or "app." For instance, a user may install the ESPN app on their smartphone or tablet ("user device"), and may thereby be able to view ESPN content on their user device through the ESPN app. In one embodiment, the interactive content overlay system of the present disclosure utilizes a software developer kit (SDK), which includes source code or other computing instructions, which may be implemented within the video content providing application of a user device. For example, an SDK may be implemented within the ESPN app itself. Additional embodiments of the present disclosure are directed to a set of application programming interfaces (APIs) hosted on a central interactive content overlay server. These APIs may be continually updated with proprietary features and functionality, as well as third-party content such as real-time game, league, team and player statistics. In another embodiment, a client administrator system coupled to the interactive content overlay server may schedule and pair client programming with various APIs related to supplemental content and services provided either directly from the interactive engagement platform or through independent third-party sources.

In one embodiment, the SDK implemented in the video content provider application requests and implements the APIs to create the interactive engagement platform's features and functionality within the video content providing application. End-users who are experiencing video content on the video content providing application can use a menu-launch button to access, through an interactive display layer on top of the video content, information and services related to the video, transaction opportunities (e.g., e-commerce, wagering, etc.), and also engage with other end-users using messaging, voice and video communications, social media services and other means of communication. Additionally, advertising and various on-screen notifications may appear over the video experience. Advertisements may be triggered either directly by the client in real time, scheduled by the client ahead of time, or automatically generated by the platform based on an API trigger resulting from various in-game scenarios (e.g., two minutes left in half, goal scored, etc.), third-party service activity (change in Fantasy leaderboard position) or activity in the platform's feature set (new message from friend received) to prompt the user to take further action.

Reference will now be made in detail to the subject matter disclosed, which is illustrated in the accompanying drawings.

Referring generally to FIGS. 1A-18, a system and method for interactive video content delivery is described, in accordance with one or more embodiments of the present disclosure.

FIG. 1A illustrates a simplified block diagram of a video content system 200, in accordance with one or more embodiments of the present disclosure. The interactive content system 200 may include, but is not limited to, one or more user devices 202, a content provider application (content provider app 204), one or more content provider servers 206, one or more third-party APIs 208, one or more third-party content providers 214, one or more third-party service providers 216, a content overlay software developer kit (content overlay SDK 210), and an interactive engagement platform 212.

In one embodiment, the one or more user devices 202 may be configured to display video content to a user. In this regard, the one or more user devices 202 may include any device capable of displaying video content including, but not limited to, smartphones, smart watches, tablets, computers, smart TVs, wearable devices, virtual/augmented reality headsets, and the like. In another embodiment, the one or more user devices 202 are configured to receive and display video content through a content provider application (content provider app 204). The content provider app 204 may be downloaded/installed on the one or more user devices 202. By way of example, the content provider app 204 may include an ESPN app, a FoxSports app, a MSNBC News app, or any other application ("app") configured to receive and display video content.

In one embodiment, the content provider app 204 is configured to receive one or more video program streams 205 from one or more content provider servers 206. The one or more content provider servers 206 may be configured to receive the video program data of the video program streams 205 from one or more third-party application program interfaces 208 (third-party APIs 208) of one or more third-party content providers 214 and/or one or more third-party service providers 216. In practice, the one or more content provider servers 206 may be configured to receive video program data from the one or more third-party content providers 214 and/or third-party service providers 216 by interfacing with the one or more third-party APIs 208. In this regard, for the sake of simplicity, data/information received from these providers may be said to be received from the one or more third-party APIs 208.

For example, as shown in FIG. 1A, the content provider app 204 may be configured to receive a first video program stream 205a from a first content provider server 206a, a second video program stream 205b from a second content provider server 206b, and a third video program stream 205c from a third content provider server 206c. For instance, in the case of a FoxSports app (e.g., FoxSports content provider app 204), the content provider app 204 may be configured to receive video program data of a first sporting event (first video program stream 205a) from a first FoxSports server (first content provider server 206a), video program data of a second sporting event (second video program stream 205b) from a second FoxSports server (second content provider server 206b), and video program data of a third sporting event (third video program stream 205c) from a third FoxSports server (third content provider server 206c). It is noted herein, however, that a single content provider server 206 may be capable of providing the content provider app 204 with multiple video program streams 205.

In one embodiment, the one or more user devices 202 may be sub-divided based on the video content being viewed. For example, as shown in FIG. 1A, a first group 201a of user devices 202a-202c may be viewing a first video program (Video Program A) via the first program stream 205a, a second group 201b of user devices 202d-202f may be viewing a second video program (Video Program B) via the second video program stream 205b, and a third group 201c of user devices 202g-202i may be viewing a third video program (Video Program C) via the third video program stream 205c. It is further noted herein that a single user device 202 may include multiple content provider apps 204. For example, a single user device 202a may include a FoxSports app (content provider app 204a), an ESPN app (content provider app 204b), and a MSNBC News app (content provider app 204c). In this regard, a single user device 202 may be configured to receive video content from a number of different content providers (e.g., content provider servers 206).

In another embodiment, interactive content overlay system 200 may include a content overlay software development kit (content overlay SDK 210) communicatively coupled to, or integrated with, the one or more content provider apps 204. For example, in the case of the FoxSports app (content provider app 204), the FoxSports app may include a content overlay SDK 210. In this regard, the one or more content overlay SDKs 210 may be installed/downloaded along with the one or more content provider apps 204 on the user devices 202 themselves.

In one embodiment, the one or more content overlay SDKs 210 are configured to receive video content data from the one or more video program streams 205. In another embodiment, an interactive engagement platform 212 may be configured to receive the video program data from the content overlay SDKs 210. For example, a content overlay SDK 210 of a FoxSports app (content provider app 204) may be configured to extract metadata from the video program streams 205a-205c and transmit the extracted metadata to the interactive engagement platform 212.

In another embodiment, the interactive engagement platform 212 may be configured to retrieve additional data/information related to the video program being displayed on a user device 202, and provide one or more supplemental data payloads to the user device 202 which are viewable to a user through an interactive content overlay produced on the user device 202. For example, extracted metadata from the video program streams 205 is sent to the interactive engagement platform to analyze and retrieve additional data/information related to the extracted metadata from one or more third-party content providers 214 and/or one or more third-party service providers 216, and transmit one or more control signals configured to generate an interactive content overlay on a graphical user interface of the one or more user devices 202. In this regard, the interactive engagement platform 212 may include one or more servers, one or more databases, one or more computing sub-systems, a control panel, a network interface, an API ingestion subsystem, and the like. The interactive engagement platform 212 may be further understood with reference to FIG. 1B.

Figure 1B:
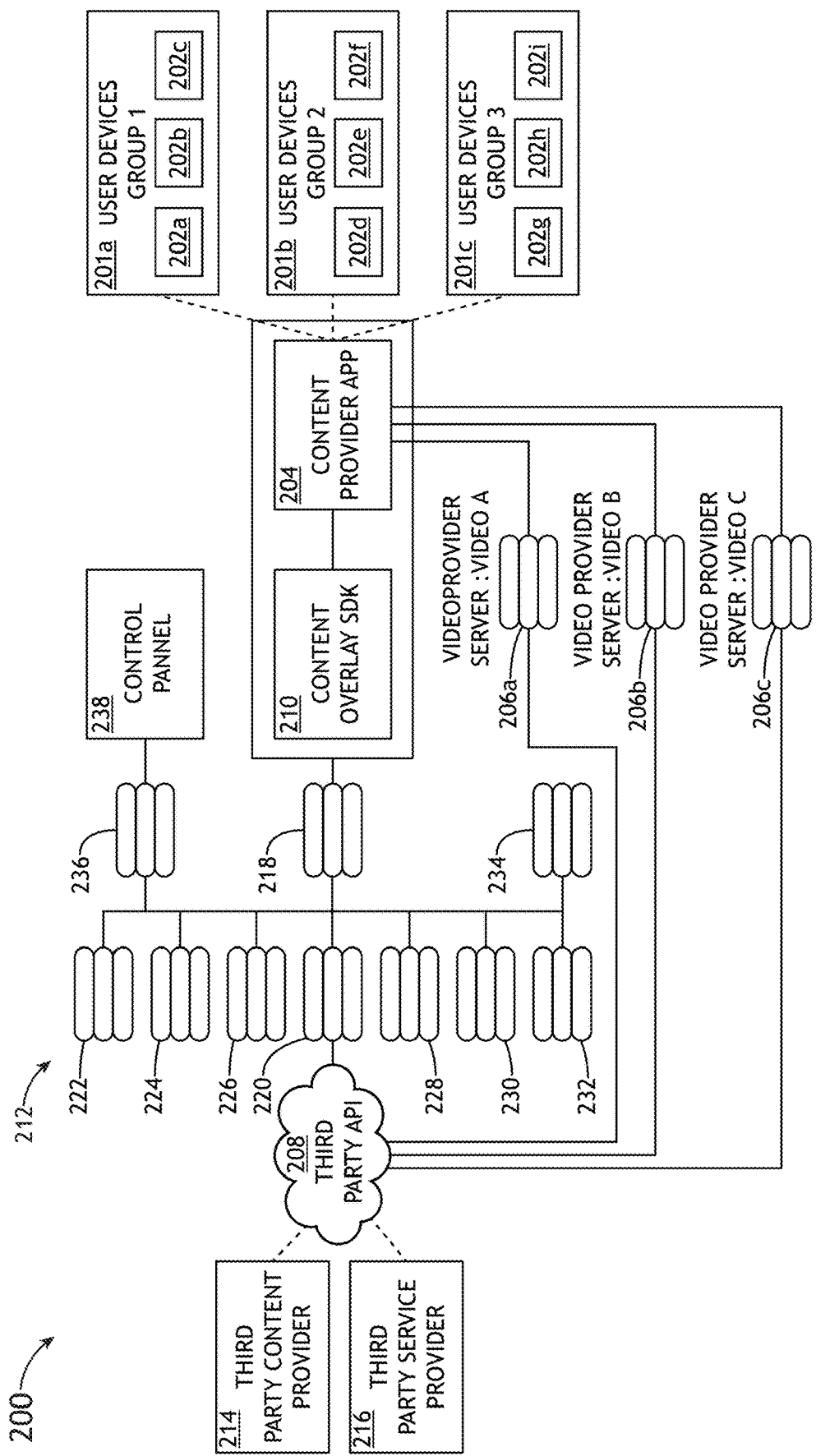
FIG. 1B illustrates a simplified block diagram of a video content system, in accordance with one or more embodiments of the present disclosure.

FIG. 1B illustrates a simplified block diagram of an interactive content overlay system 200, in accordance with one or more embodiments of the present disclosure. It is noted herein that any description associated with the interactive content overlay system 200 depicted in FIG. 1A may be regarded as applying to the interactive content overlay system 200 depicted in FIG. 1B, unless noted otherwise herein. Conversely, any description associated with the interactive content overlay system 200 depicted in FIG. 1B may be regarded as applying to the interactive content overlay system 200 depicted in FIG. 1A, unless noted otherwise herein.

The interactive engagement platform 212 may include one or more servers, systems, databases, and the like. For example, the interactive engagement platform 212 may include, but is not limited to, an SDK/API server 218, an API ingestion system 220, one or more user databases 222, an API matching system 224, an event scheduling system 226, a messaging and communications system 228, an advertising system 230, an analytics system 232, an analysis system 234, an admin server 236, and a control panel 238. As will be described in further detail herein, it is contemplated that the various systems and servers of the interactive engagement platform 212 may take any form known in the art. For example, the various systems of the interactive engagement platform 212 may include one or more servers including one or more processors and memory. For instance, the messaging and communications system 228 may include a dedicated server including one or more processors and memory. By way of another example, the messaging and communications system 228 may include a messaging or voice/video system communicatively coupled to the SDK/API server 218, wherein the messaging and/or voice/video system is provided by a stand-alone messaging provider or voice/video provider, such as Facebook Messenger, Houseparty, and the like. In this regard, it is noted herein that the interactive engagement platform 212 may include any number of servers, sub-systems, databases, and the like. In this regard, the configuration and make-up of the interactive engagement platform 212 illustrated in FIG. 1B is provided solely for illustration, and is not to be regarded as limiting, unless noted otherwise herein.

In one embodiment, the SDK/API server 218 may include data and programming instructions for carrying out various steps/features of the present disclosure. In this regard, the SDK/API server 218 may include program instructions for generating the various features and functions of an interactive content overlay on a graphical user interface of a user device 202.

An example may prove to be illustrative. In this example, a first group 201a of user devices 202a-202c may be viewing a football game (video program) through the FoxSports app (content provider app 204). The content overlay SDK 210 of the content provider app 204 may be configured to extract metadata of the video program data received through the video program stream 205a, and transmit the extracted metadata to the interactive engagement platform 212. The SDK/API server 218 of the interactive engagement platform 212 may be configured to receive the extracted metadata. The extracted metadata of a video program may include information regarding the video program including, but not limited to, the names of individuals/entities within the video program, the name of the program, the provider of the video program, and the like.

Continuing with the same example, the API ingestion server 220 may then be configured to search one or more third-party content providers 214 and/or one or more third-party service providers 216, via one or more third-party APIs 208, for additional content related to the extracted metadata. In this regard, the API ingestion server 220 may be configured to interface with the one or more third-party APIs 208 of the one or more third-party content providers 214 and/or the third-party service providers 216. For instance, if the video program was an NFL game between the Los Angeles Rams and the New England Patriots, the API ingestion system 220 may be configured to search and retrieve, from the one or more third-party content providers 214 and/or one or more third-party service providers 216, additional information/data related to the Rams, Patriots, the NFL, players/coaches on each team, and the like.

Continuing with the same example, the SDK/API server 218 of the interactive engagement platform 212 may be configured to transmit the retrieved additional information to the content overlay SDK 210 and the content provider app 204. The SDK/API server 218 may be further configured to generate one or more control signals configured to cause the one or more user devices 202 to display an interactive content menu. Furthermore, the SDK/API server 218 may be configured to generate one or more control signals configured to associate the additional content with at least one selectable button of the interactive content menu. For instance, the additional content retrieved by the one or more third-party content providers 214 and/or one or more third-party service providers 216 may include data for users to purchase Rams/Patriots/NFL merchandise, and data regarding statistics of both teams and/or particular players. In this regard, the SDK/API server 218 may be configured to associate the merchandise data with a first selectable button of the interactive content menu, and the statistics data with a second selectable button of the interactive content menu.

In another embodiment, the interactive engagement platform 212 may include one or more registration servers 222 configured to log and/or store new audience members associated with the one or more user devices 202. In this regard, the registration servers 222 may serve as a "user database" in some respects. In another embodiment, registration server 222 may include a filter server/crowd engine configured manage a global audience population and randomize or filter the global audience population based on various parameters into a limited audience population for display in the mobile content provider application 204. The interactive engagement platform 212 may further include at least one event data system 226 configured to monitor and store data related to audience-member activities while viewing video content. As it is used herein, the terms "users" or "audience members" may be regarded as referring to individuals viewing video content through the one or more user devices 202, and may be used interchangeably. In another embodiment, the interactive engagement platform 212 includes a messaging and communications system 228 configured to receive, manage, and disseminate messages and invitations between and among audience members and their friends/contacts. As noted previously herein, the messaging and communications system 228 may include one or more dedicated messaging and communications servers, or may additionally/alternatively include a messaging and communications system provided by an outside source (e.g., Facebook Messenger, Houseparty, and the like). In another embodiment, one or more media servers, including an advertising system 230, may manage receipt and dissemination of various media and data related to various video content, including advertising, which may be associated with one or more selectable buttons of the interactive overlay content generates on the user devices 202.

As noted previously herein, an API ingestion server 220 may be configured to communicatively couple, via the one or more third-party APIs 208, to one or more third-party content providers 214 and/or one or more third-party service providers 216. In this regard, the interactive engagement platform 212 may provide social engagement experiences relating to video content received from a plurality of third-party content providers 214/third-party service providers 216 across multiple mobile user devices 202. For example, the first group 201a of user devices 202a-202c may be viewing a first video program (Event 1), whereas the second group 201b and the third group 201c are viewing second and third video programs, respectively (Event 2 and Event 3). Events 1, 2, and 3 may each include individually distinct video content. Accordingly, the interactive content overlay system 200 including interactive engagement platform 212 may be configured to provide social engagement experiences tailored for specific audiences, specific events/programs, content providers, and the like.

Accordingly, this permits the interactive engagement platform 212 architecture to function with multiple partners producing and/or making available in their mobile video content providing application (content provider apps 204) multiple live and on-demand videos concurrently. For example, the National Football League ("NFL") and its rights holders can provide football game content having multiple, distinct implementations of the interactive content overlay produced on the graphical user interfaces of user devices 202 viewing the Chicago Bears/Green Bay Packers game. Meanwhile, individuals viewing the Dallas Cowboys/Washington Redskins game on the FoxSports mobile application would be able to simultaneously view content in the interactive content overlay pertaining to the Dallas Cowboys/Washington Redskins game.

Additionally, FoxSports could customize the interactive content overlay of generated on the graphical user interface to provide a distinct experience for different games. This may include unique content, unique functionality, or unique advertising. For example, FoxSports may sell advertising rights for the Bears/Packers game to Coca-Cola ("Coke"), and may further sell the advertising rights for the Cowboys/Redskins game to Pepsi that is occurring at the same time. In this regard, advertising provided through the interactive content overlay generated by the interactive engagement platform 212 may be particular to the video program being viewed on each particular user device 202.

It is noted herein that the one or more third-party content providers 214 and the one or more third-party service providers 216 may generally and collectively be referred to as "one or more third-party providers 214, 216."

It is further noted herein that the configuration of system 200 shown and described in FIG. 1B is not to be regarded as limiting, unless noted otherwise herein. In this regard, it is contemplated herein that various steps of functions shown and described as being carried out by one component of system 200 may additionally and/or alternatively be carried out by another component of system 200. For example, while the retrieval of supplemental content (supplemental data payloads) is shown and described as being carried out by the one or more servers of the interactive engagement platform 212 (e.g., one or more interactive engagement platform servers), this may additionally and/or alternatively be carried out by the one or more video content servers 206. For instance, the one or more video content servers 206 may be configured to extract metadata from the one or more video program streams 205, retrieve supplemental content from the one or more third-party providers 214, 216, cause the plurality of user devices 202 to display an interactive content overlay, and deliver the supplemental content to the plurality of user devices 202 such that it may be viewed/displayed within the interactive content overlay. By way of another example, the plurality of user devices 202 may themselves be communicatively coupled to the one or more third-party providers 214, 216 such that the plurality of user devices 202 are configured to extract metadata from the one or more video program streams 205, retrieve supplemental content from the one or more third-party providers 214, 216, display an interactive content overlay, and display the supplemental content within an interactive content overlay.

Figure 2A:
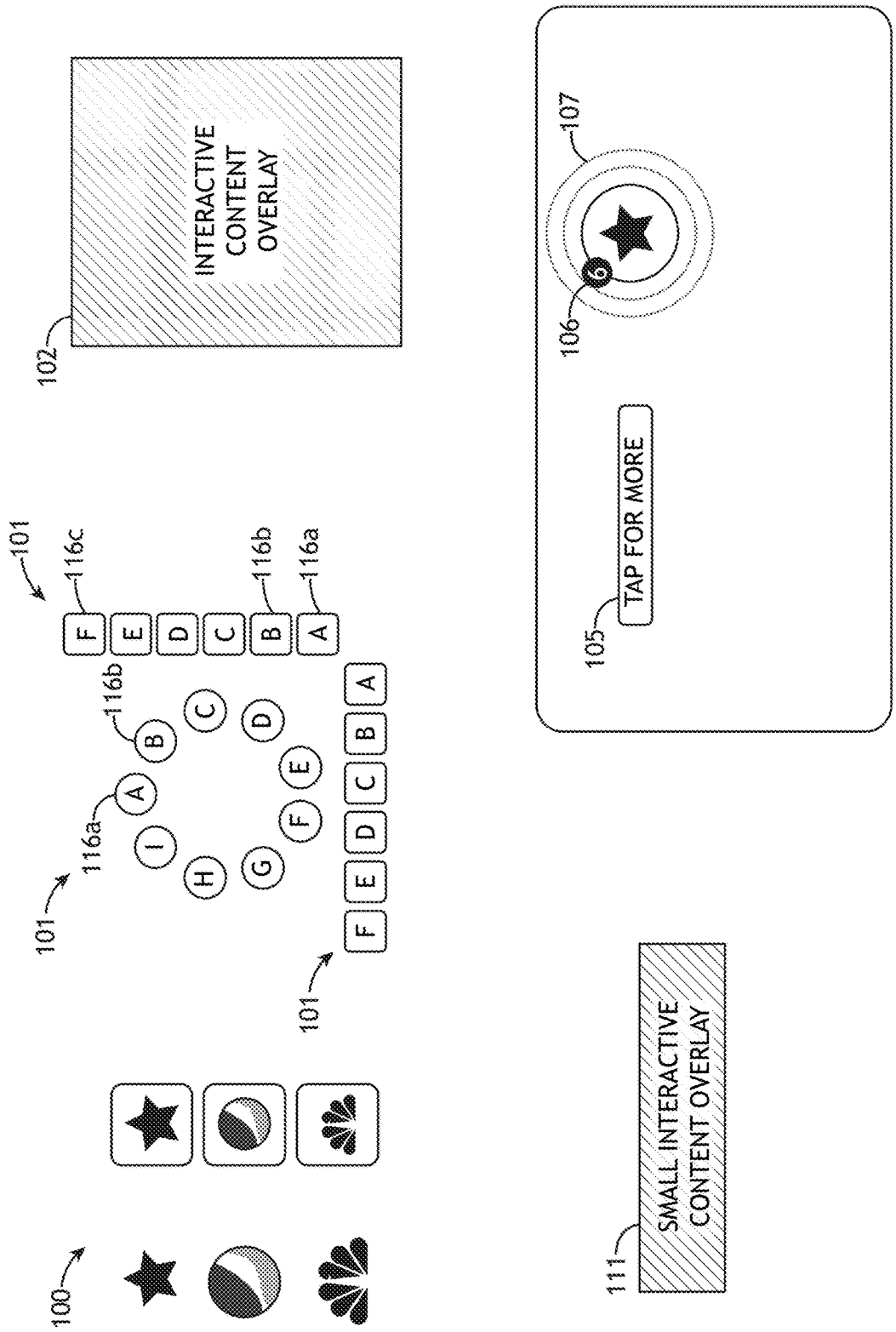
FIG. 2A illustrates various structures of an interactive content overlay for a graphical user interface, in accordance with one or more embodiments of the present disclosure.
Figure 2B:
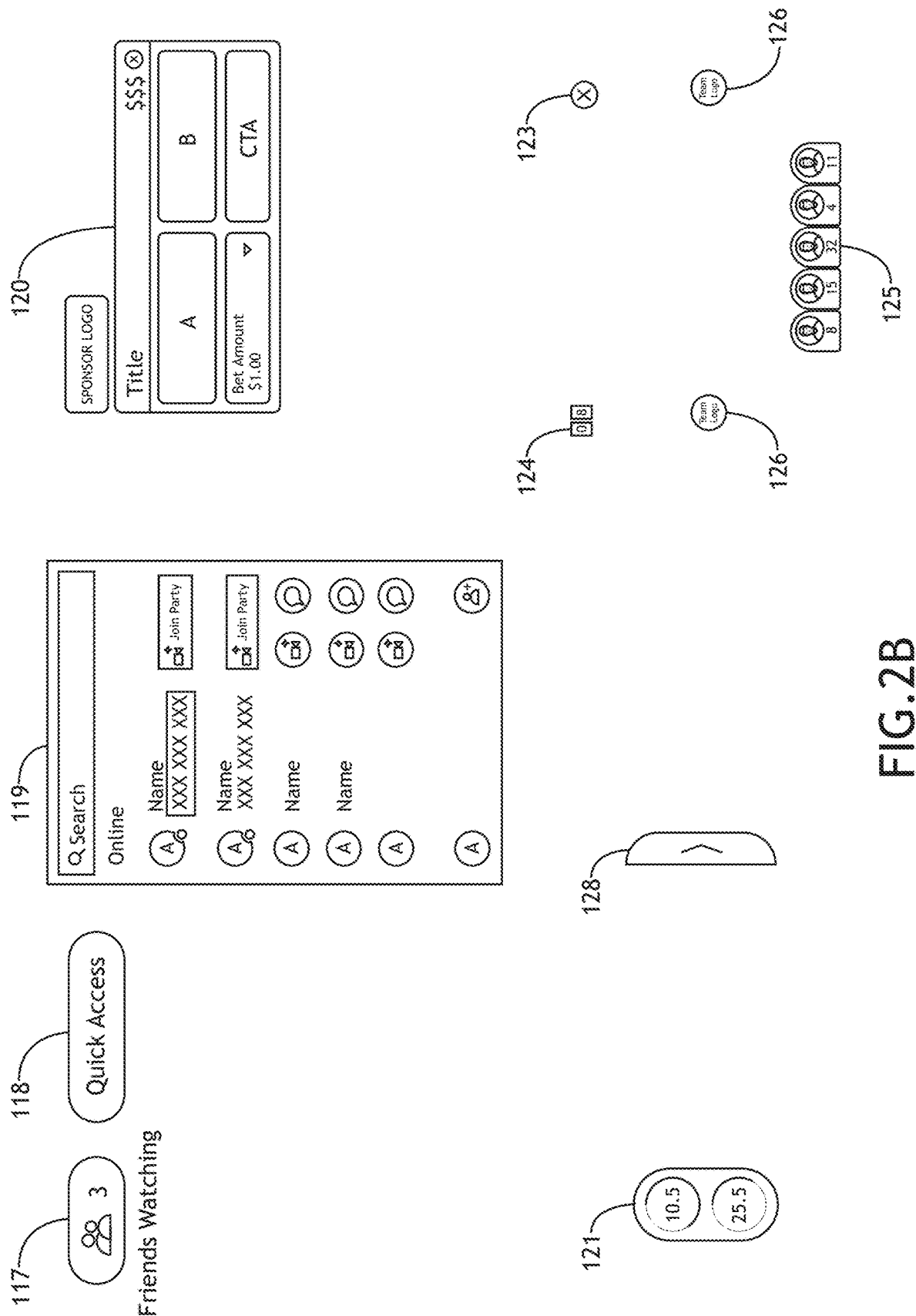
FIG. 2B illustrates various structures/components of an interactive content overlay for a graphical use interface, in accordance with one or more embodiments of the present disclosure.

FIGS. 2A-2B illustrate various structures of an interactive content overlay for a graphical user interface, in accordance with one or more embodiments of the present disclosure.

As noted previously herein, the interactive engagement platform 212 of the interactive content overlay system 200 may be configured to generate an interactive content overlay on the graphical user interfaces of the one or more user devices 202. As shown in FIG. 2A, an interactive content overlay may include, but is not limited to, a menu-launch button 100, a submenu button set 101 including one or more selectable buttons 116, an interactive content overlay window 102, a small interactive content overlay window 111, and tooltips 105.

In some embodiments, the interactive engagement platform server 212 is configured to generate one or more control signals configured to associate at least one data payload of the one or more retrieved data payloads with at least one selectable button of the submenu button set. For example, the one or more control signals are configured to associate a first data payload with a first selectable button, and a second data payload with a second selectable button. For instance, a selection of the first selectable button may be configured to cause the user device to display supplemental content of a first data payload in a first interactive content overlay window. In another instance, the selection of the second selectable button of the second selectable button may be configured to cause the user device to display supplemental content of the second data payload in a second interactive content overlay window. It is noted herein that the second interactive overlay content window may be different from the first interactive content overlay window. Further, at least one of the first interactive content overlay window or the second interactive content overlay window may be at least partially transparent.

In one embodiment, a menu-launch button 100 may be customized to appear as the logo of the media partner, advertiser, team insignia, or other preferred mark. This may be similar to the watermark logos that often appear on video content, which may cause the menu-launch button 100 to appear integrated within the video program displayed on a user device 202. The submenu button set 101 including one or more selectable buttons 116 may be opened/expanded upon selection of the menu-launch button 100. As shown in FIG. 2A, the submenu button set 101 may be configured in a number of configurations, including a circular configuration, a linear-vertical configuration, and a linear-horizontal configuration. As noted previously herein, the interactive engagement platform 212 may be configured to associate data retrieved from third-party providers 214, 216 with the one or more selectable buttons 116 of the submenu button set 101. Additional data associated with the one or more selectable buttons may be associated with the video program being viewed, and may include, but is not limited to, messaging, third-party social media, news articles, statistics, e-commerce/transaction capabilities, merchandising, advertising, betting, and the like.

In one embodiment, the interactive content overlay window 102 and/or the small interactive content overlay window 111 may be configured to display additional content related to the video program being viewed. In another embodiment, the interactive content overlay window 102 and/or the small interactive content overlay window 111 may be partially transparent. It is noted herein that providing for partially transparent overlay content may allow a user to view additional content/data related to the video program being viewed, while not completely obstructing the video program.

In another embodiment, a menu-launch button 100 may include tooltips 105, one or more notifications 106, and/or animations 107. The tooltips 105, notifications 106, and/or animations 107 may include attention-grabbing temporary displays configured to notify and encourage the users/audience members to interact with the menu-launch button 100. The tooltips 105, notifications 106, and/or animations 107 may be configured to make the end-user aware of new content available within the interactive content overlay provided by the interactive engagement platform 212. For example, tooltips 105, notifications 106, and/or animations 107 may inform a user of significant activity, such as the presence of a VIP in the interactive engagement platform, the availability of a new poll provided in the interactive content overlay, or new activity related to content or services provided by third-parties via APIs, such as scoring updates related to the user's daily fantasy team, a specific wager placed on a game, or a flash sale on a game jersey. The interactive content overlay on the graphical user interface may include various other controls, buttons, and functionality described herein for enabling the end-user to engage with the interactive content overlay provided by the interactive engagement platform 212. Further, the interactive content overlay on the graphical user interface may include various configurations of overlay windows, controls, buttons, and the like.

As noted previously herein, the interactive engagement platform 212 of the interactive content overlay system 200 may be configured to generate an interactive content overlay on the graphical user interfaces of the one or more user devices 202. As shown in FIGS. 2A-2B, an interactive content overlay may include, but is not limited to, a menu-launch button 100, an interactive content overlay 102, a small interactive content overlay 111, an active contacts indicator button 117 (e.g., "who's watching indicator button 117"), a quick return selectable button 118, a contacts overlay 119, a repeatable bet overlay 120, bet tracking indicators 121, a swipe grab indicator 122, an exit button 123, and in-play interactive game indicators (e.g., interactive game scoreboard 124, interactive game player selector 125, interactive game team toggle 126).

It is noted herein that other arrangements/configurations of the interactive content overlay and/or submenu button set 101 may be used without departing from the spirit and scope of the present disclosure. The interactive content overlay is further shown and described in U.S. Design patent application Ser. No. 29/686,931 filed on Apr. 9, 2019, entitled DISPLAY SCREEN OR PORTION THEREOF WITH TRANSITIONAL GRAPHICAL USER INTERFACE FOR AN INTERACTIVE CONTENT OVERLAY, and U.S. Design patent application Ser. No. 29/706,035 filed on Sep. 17, 2019, entitled DISPLAY SCREEN OR PORTION THEREOF WITH TRANSITIONAL GRAPHICAL USER INTERFACE FOR AN INTERACTIVE CONTENT OVERLAY, both of which are incorporated herein by reference in the entirety.

Figure 3:
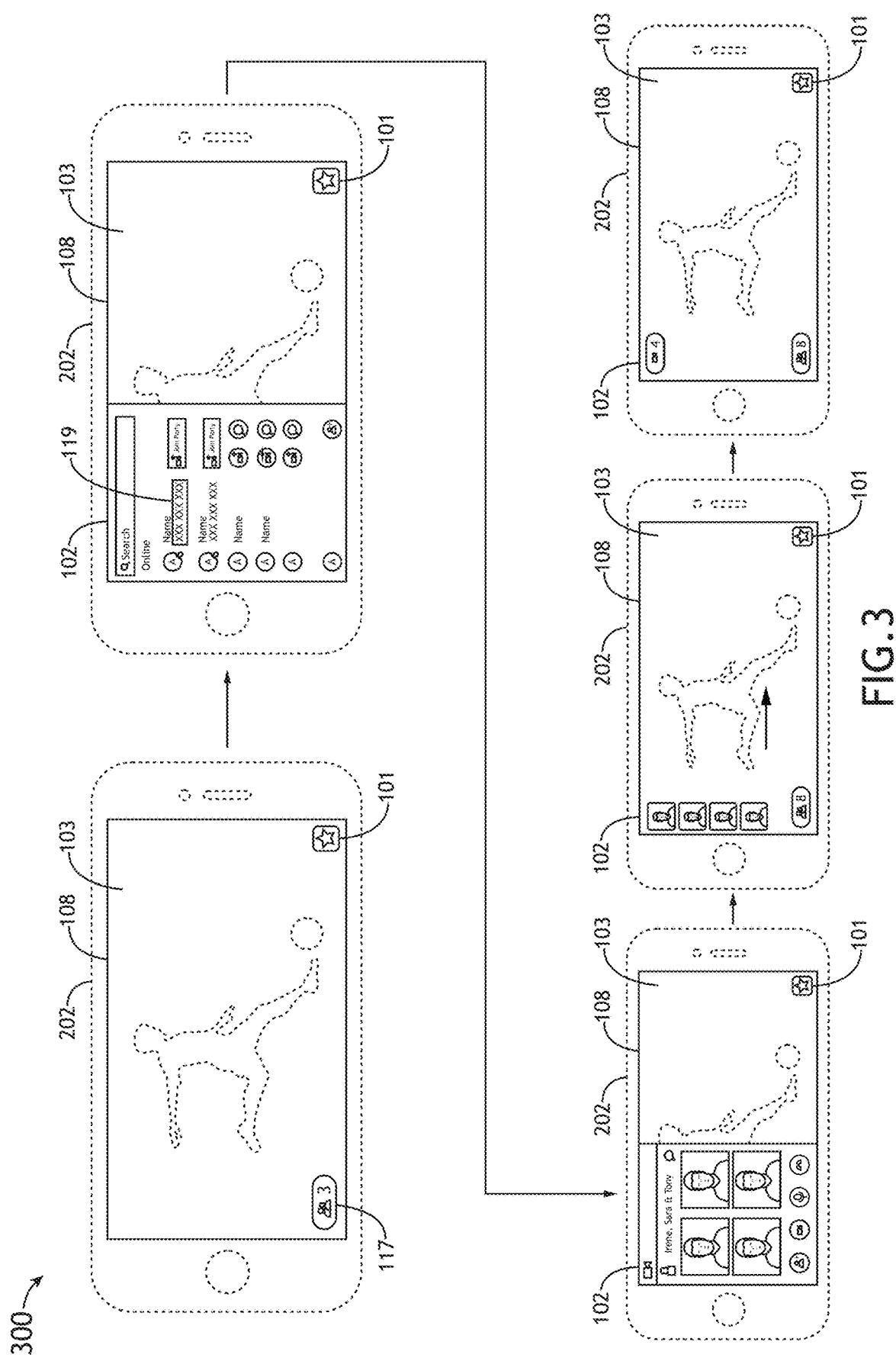
FIG. 3 illustrates a series of interactive content overlays on a graphical user interface depicting the ability to connect with contacts via the interactive content overlay, in accordance with one or more embodiments of the present disclosure.

FIG. 3 illustrates a series of interactive content overlays 300 on a graphical user interface depicting the ability to connect with contacts via the interactive content overlay, in accordance with one or more embodiments of the present disclosure. In particular, FIG. 3A illustrates a series of interactive content overlay Although the user device 202 is shown in the landscape orientation (horizontal orientation), it should be understood that various configurations/orientations of the user device 202 may be used without departing from the scope of the present disclosure. For example, the user devices 202 may be in a portrait orientation (vertical orientation).

The interactive content overlay 102 may include an active contacts indicator button 117 (e.g., "who's watching indicator button 117"). The active contacts indicator button 117 may display a number of contacts which are "active." As it is used herein, "active" may be used to refer to contacts/users which are currently within an application ("app") who may or may not be viewing video content. Upon selection of the active contacts indicator button 117, the interactive content overlay 102 may appear displaying a contacts overlay 119 including a list of contacts. For example, the list of contacts may include one or more "active" (e.g., "online") contacts which are currently active and available for voice or video calling and messaging functionality. For instance, for active/online contacts, the contacts overlay 119 may show what video program each particular active/online contact is currently viewing. By way of another example, the list of contacts may include one or more "offline" contacts which are not currently active on the video content provider application who can be invited to sign on to the application to participate in voice or video calling and messaging functionality. Additionally, the list of contacts may include one or more "offline" contacts who have not the downloaded the application or connected to the social engagement software platform who can be invited to download and sign on to the application.

In embodiments, a user may be able to select one or more contacts from the contacts overlay 119 with which to start a group chat and/or a group voice or video call.

Figure 4:
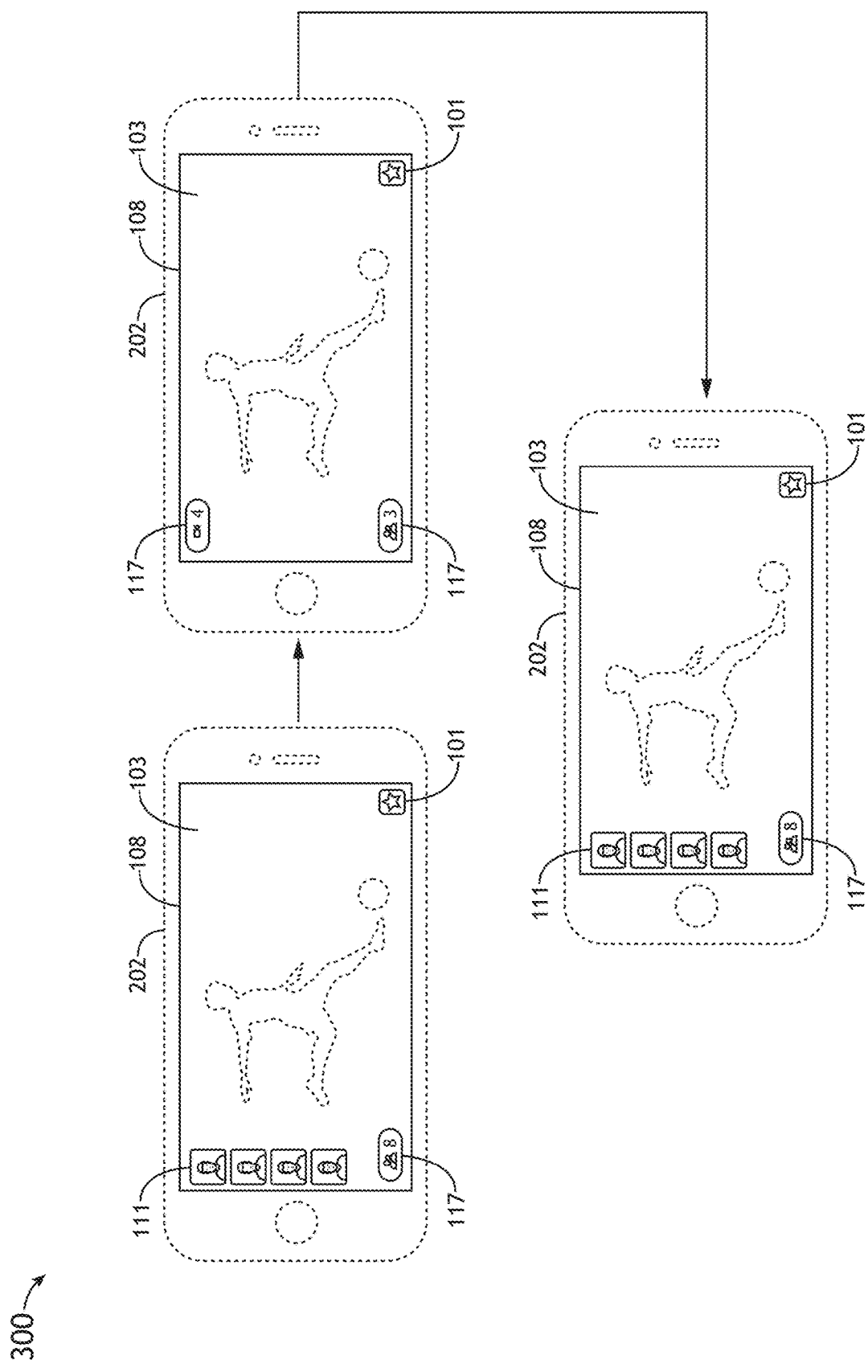
FIG. 4 illustrates a series of interactive content overlays on a graphical user interface depicting a quick return selectable button, in accordance with one or more embodiments of the present disclosure.

FIG. 4 illustrates a series of interactive content overlays on a graphical user interface depicting a quick return selectable button 118, in accordance with one or more embodiments of the present disclosure.

In some embodiments, minimization of the interactive content overlay 102 may generate a quick return selectable button 118. For example, upon selection of a portion of the graphical user interface 108 not including the interactive content overlay 102, the interactive content overlay 102 may disappear/minimize and generate the quick return selectable button 118. By way of another example, wiping (or swiping) one or more small interactive content overlays 111 off of the screen, the one or more small interactive content overlays 111 may disappear/minimize and generate the quick return selectable button 118.

In embodiments, the quick return selectable button 118 may be configured to direct a user back to the closed/minimized interactive content overlay (e.g., the interactive content overlay 102 or small interactive content overlay 111). For example, the quick return selectable button 118 may be configured to generate the return from off screen of the one or more small interactive content overlays 111. In this regard, selection of a quick return selectable button 118 may allow a user to quickly and efficiently access the most recently viewed interactive content overlay (e.g., the interactive content overlay 102 or small interactive content overlay 111).

For example, as shown in FIG. 4, a small interactive content overlay 111 may include a set of small videos or profile icons of one or more participants in a group voice or video call with a user. Upon wiping (or swiping) the small interactive overlay 111 off the screen, a quick-return selectable button 118 may be generated. Selection of the quick return selectable button 118 may cause the last-viewed small interactive content overlay 111 to reappear. In this regard, the quick return selectable button 118 may serve to "trigger" a small interactive content overlay 111 such that it may be quickly and readily accessed.

In another embodiment, an interactive content overlay 102 may include a list of contacts in a group voice or video call with the user, a list of bets recently placed, or an interactive game a user is engaged in. Upon selection of a portion of the graphical user interface 108 not including the interactive content overlay 102, the interactive content overlay 102 may disappear/minimize. In this example, minimization of the interactive content overlay 102 may generate a quick return selectable button 118. Selection of the quick return selectable button 118 may cause the last-viewed interactive content overlay 102 including the contacts of the group voice or video call to reappear. In this regard, the quick return selectable button 118 may serve to "save" an interactive content overlay 102 such that it may be quickly and readily accessed.

Figure 5:
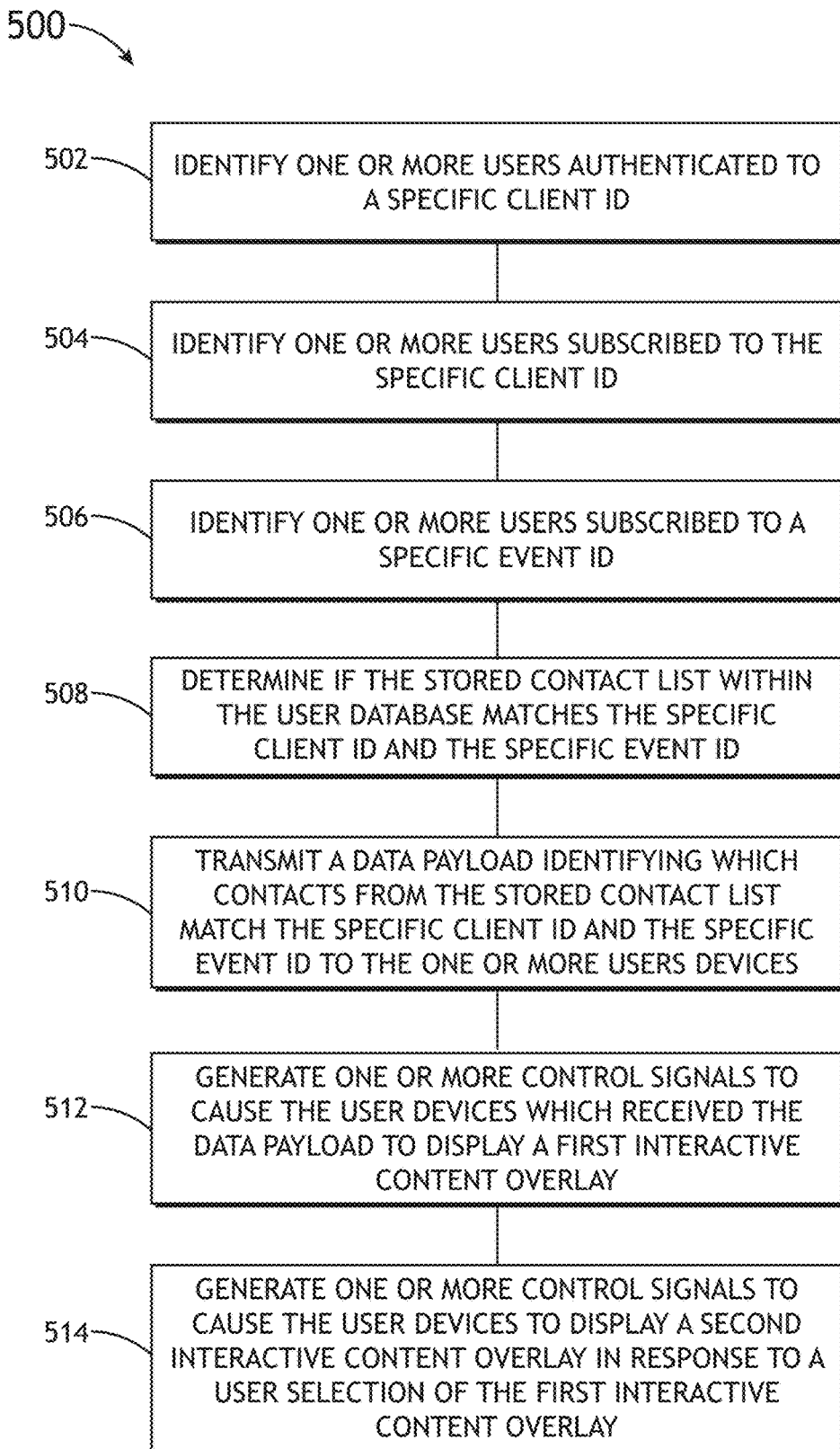
FIG. 5 illustrates a flowchart depicting a method for connecting with contacts via the interactive content overlay, in accordance with one or more embodiments of the present disclosure.

FIG. 5 illustrates a flowchart depicting a method 500 for connecting with contacts via the interactive content overlay, in accordance with one or more embodiments of the present disclosure. It is noted herein that the steps of method 500 may be implemented all or in part by system 200. It is further recognized, however, that the method 500 is not limited to the system 200 in that additional or alternative system-level embodiments may carry out all or part of the steps of method 500.

In a step 502, the interactive engagement platform 212 identifies one or more users (e.g., user devices 202) authenticated for a specific Client ID. For example, the interactive engagement platform 212 may identify all users associated with a specific client (e.g., NBC) who may or may not be online. For instance, the interactive engagement platform 212 may filter the user database (e.g., registration server 222) for one or more users who have authenticated the NBC Sports app (e.g., connect to the platform on the NBC app).

In a step 504, the interactive engagement platform 212 identifies one or more users (e.g., user devices 202) subscribed to a specific Client ID. For example, the interactive engagement platform 212 may filter the list of users associated with the specific client identified in step 502 to identify one or more users who are currently in the specific client application at that moment in time. For instance, the interactive engagement platform 212 may filter the list of NBC Sports app users generated in step 502 for one or more users who are currently active on the NBC Sports app.

In a step 506, the interactive engagement platform 212 identifies one or more users (e.g., user devices 202) subscribed to specific Event ID. For example, the interactive engagement platform 212 may filter the list generated in step 504 to identify one or more users who are subscribed to one or more livestreams. The one or more livestreams may be identified in the interactive engagement platform 212 by a specific Event ID. For instance, the interactive engagement platform 212 may filter the list generated in step 504 to identify one or more users who are watching the Yankees vs Dodgers livestream. The one or more livestreams may include any livestream know in the art including, but not limited to, a fantasy league livestream, sporting league livestream, a gambling (or betting) service livestream, or the like.

In a step 508, the interactive engagement platform 212 determines if the stored contact list within the one or more registration servers 222 (e.g., user database 222) matches the specific Client ID and the specific Event ID. For example, the interactive engagement platform 212 may determine if the one or more users matches a stored contact list. For instance, the interactive engagement platform 212 may be configured to determine which of the one or more users are friends/contacts. In this regard, the interactive engagement platform 212 may be configured to determine who among the friends/contacts is currently active/online and what particular livestream they are watching, if any. Continuing with the previous example, the interactive engagement platform 212 may be configured to determine which of a user's friends/contacts is online and watching the Yankees vs Dodgers livestream.

In a step 510, the interactive engagement platform 212 transmits a data payload identifying which contacts from the stored contact list match the specified Client ID and the specified Event ID to the one or more users (e.g., user devices 202). For example, the interactive engagement platform 212 may transmit the data payload identifying which of the one or more users match the stored contact list to the one or more user devices 202 for display in the interactive content overlay (in step 512). For instance, the interactive engagement platform 212 may be configured to transmit to the user devices 202 which of the one or more users are friends/contacts. In this regard, the interactive engagement platform 202 may be configured to transmit to the user devices 202 who among the friends/contacts is currently active/online and what particular livestream they are watching, if any. Continuing with the previous example, the interactive engagement platform 212 may be configured to transmit to the user devices 202 which of a user's friends/contacts is online and watching the Yankees vs Dodgers livestream.

In a step 512, the interactive engagement platform 212 generates one or more control signals to cause the user devices 202, which received the data payload, display information/data associated with the data payload in the graphical user interface 108. For example, the user devices 202 which received the data payload may display a first interactive content overlay (e.g., a small persistent interactive content overlay). For instance, the small persistent interactive content overlay may include an active contacts indicator button 117 (e.g., "who's watching indicator button 117").

In a step 514, upon a user selection of the first persistent interactive overlay (e.g., the active contacts indicator button 117), the interactive engagement platform 212 generates one or more control signals to cause the user devices 202 to display a second interactive content overlay. For example, the second interactive content overlay may include who from the user's contact list are authenticated to the Client ID. By way of another example, the second interactive content overlay may include who from the user's contact list are subscribed to/active on Client ID (e.g., NBC Sports app) and Event ID (e.g., Yankee vs Dodges livestream). By way of another example, the second interactive content overlay may include who from the user's contact list are subscribed to the Client ID.

Figure 7:
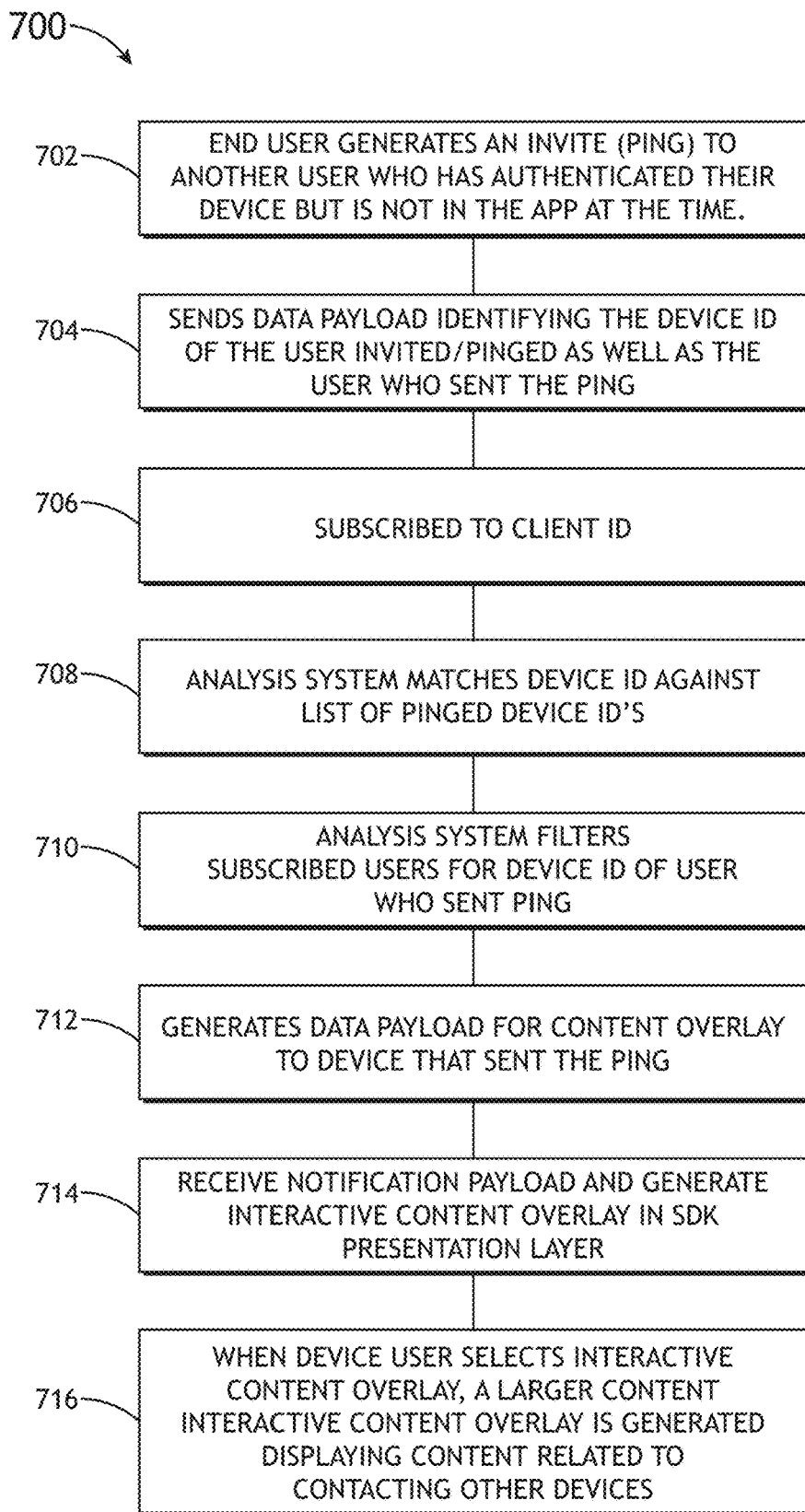
FIG. 7 illustrates a flowchart depicting a method for generating notifications on the interactive content overlay, in accordance with one or more embodiments of the present disclosure.

FIG. 7 illustrates a flowchart depicting a method 700 for generating notifications on the interactive content overlay, in accordance with one or more embodiments of the present disclosure. It is noted herein that the steps of method 700 may be implemented all or in part by system 200. It is further recognized, however, that the method 700 is not limited to the system 200 in that additional or alternative system-level embodiments may carry out all or part of the steps of method 700.

In a step 702, a user (User 1) generates an invite (or message or wave/ping) to another user (User 2) who has authenticated their device but is not in the app at that time.

In a step 704, the interactive engagement platform 212 retrieves one or more data payloads identifying the device ID of the user invited (or messaged or waved/pinged) (User 2) and the device ID of the user who sent the invite (or ping) (User 1).

In a step 706, the invited (or messaged or waved/pinged) user (User 2) enters the client app and the interactive engagement platform 212 retrieves one or more data packets from one or more users subscribed to a specific Client ID.

In a step 708, the analysis system 234 matches the device ID against a list of invited (or messaged or waved/pinged) device IDs.

In a step 710, the analysis system 234 identifies one or more users (e.g., user devices 202) subscribed to the device ID of the user who sent the invite (or message or wave/ping) (User 1).

In a step 712, the interactive engagement platform 212 generates a data payload for content overlay to the user device that sent the invite (or message or wave/ping) (User 1).

Figure 6:
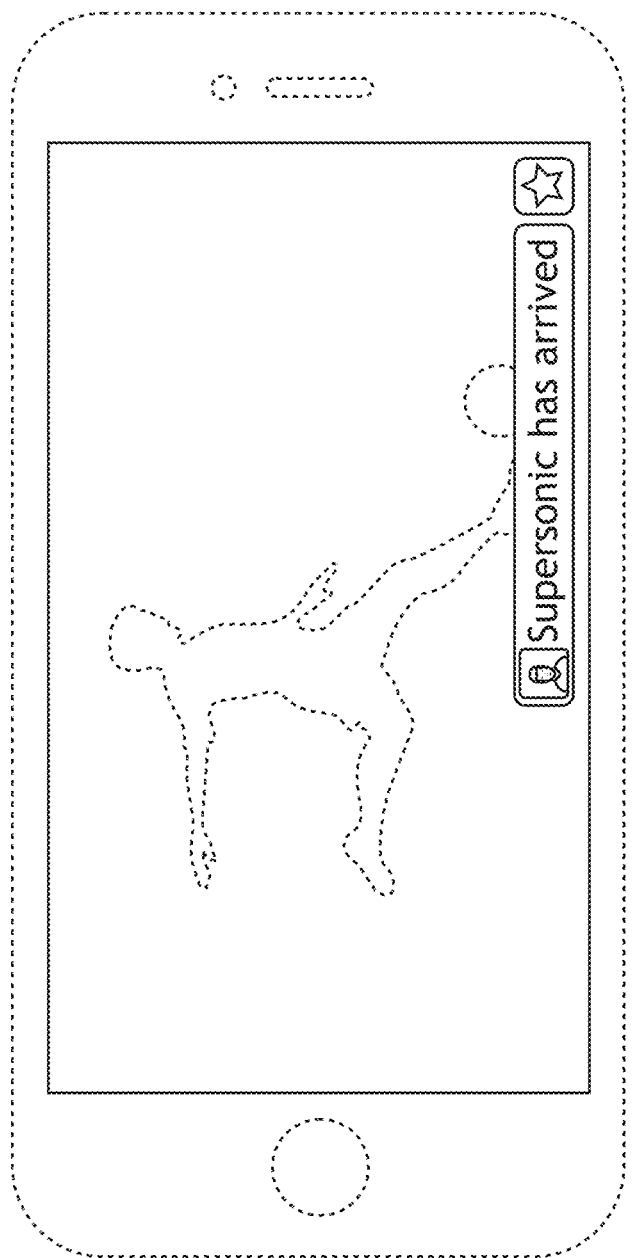
FIG. 6 illustrates an interactive content overlay on a graphical user interface including a notification, in accordance with one or more embodiments of the present disclosure.

In a step 714, the user device receives a notification payload and generates a first interactive content overlay in SDK presentation layer. For example the user device may generate the first interactive content overlay in a SDK presentation layer, which consists of visual and interactive media that is generated by the SDK and sits on top of existing content screens in apps to which the SDK is integrated. For example, a notification as shown in FIG. 6 may be received on the user device 202.

In a step 716, when the device user selects the first interactive content overlay, a second interactive content overlay is generated displaying content related to contacting other devices.

Figure 8:
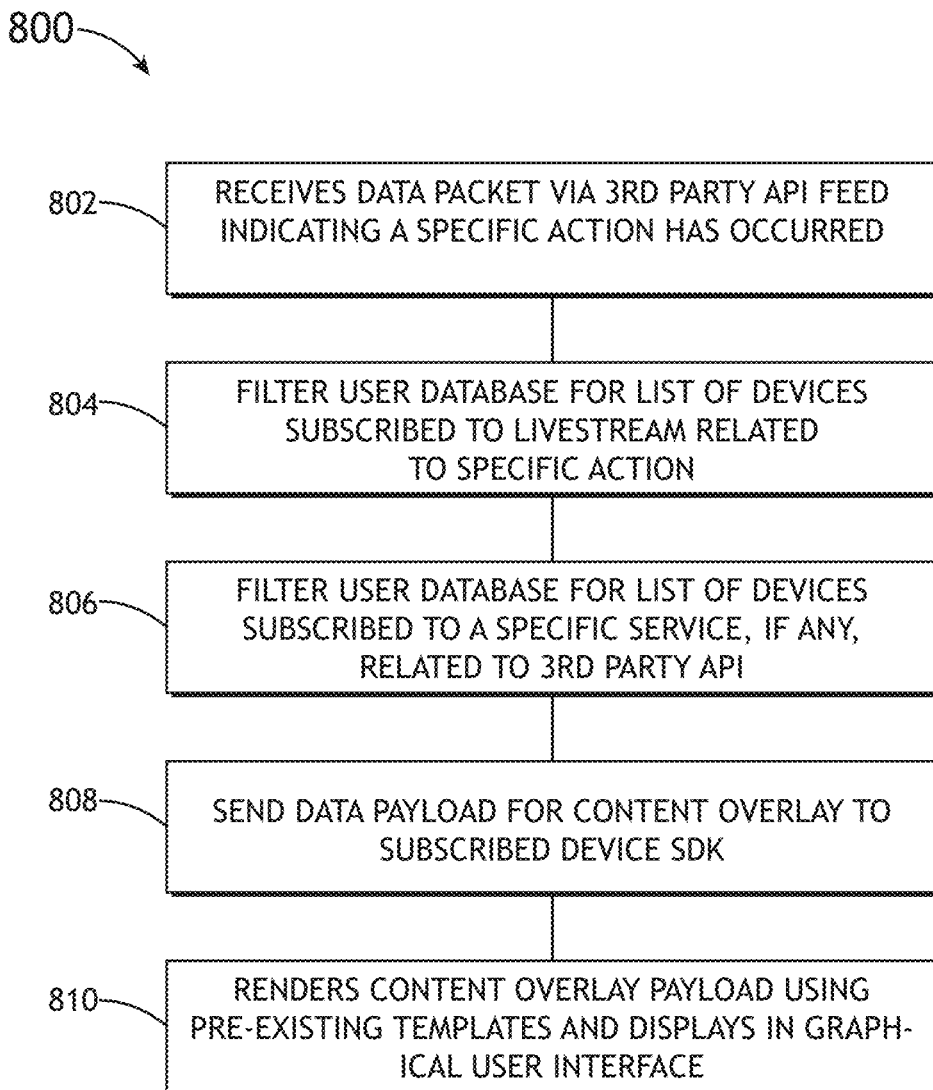
FIG. 8 illustrates a flowchart of a method for delivering in-app third party notifications in an interactive content overlay system, in accordance with one or more embodiments of the present disclosure.

FIG. 8 illustrates a flowchart of a method 800 for delivering in-app third party notifications in an interactive content overlay system, in accordance with one or more embodiments of the present disclosure. More specifically, method 800 illustrates the generation of in-app notifications related to third-party services. For example, the in-app notifications may include, but are not limited to, Twitter notifications, Yahoo Fantasy Football notifications, bet result notifications from a sports book, and the like. It is noted herein that the steps of method 800 may be implemented all or in part by system 200. It is further recognized, however, that the method 800 is not limited to the system 200 in that additional or alternative system-level embodiments may carry out all or part of the steps of method 800.

In a step 802, the interactive engagement platform 212 receives a data packet from a third-party API 208 indicating a specific action has occurred. For example, the API ingestion system 220 may receive a data packet from Yahoo Fantasy Football (e.g., third party content provider 214/third-party service provider 216) via a third-party API 208. The data packet may indicate that Player 1 scored a touchdown, and thereby scored points for Yahoo Fantasy Football users with Player 1 on their team. For instance, the third-party API 208 may transmit a Tweet "Touchdown Tom Brady!", and a user device 202 may display a notification showing the Tweet: "Touchdown Tom Brady!" By way of another example, a data packet received from a third-party gambling site may indicate that a team/player scored, or may indicate that the odds of a particular bet have changed.

In a step 804, the interactive engagement platform 212 identifies one or more users (e.g., user devices 202) subscribed to a livestream related to the specific action. For example, continuing with the Yahoo Fantasy Football example, the interactive engagement platform 212 may search, query, filter, or otherwise identify within the one or more registration servers 222 (e.g., user databases 222) one or more user devices 202 which are subscribed to the FoxSports Bears vs Packers livestream.

In a step 806, the interactive engagement platform 212 identifies one or more user devices 202 subscribed to a specific service related to the third-party API 208. For example, the interactive engagement platform 212 may search, query, filter, or otherwise identify within the one or more registration servers 222 (e.g., user databases 222) one or more user devices 202 which are subscribed to a service related to the Yahoo Fantasy Football API (e.g., third-party API 208).

In a step 808, the interactive engagement platform 212 transmits a data payload to the one or more identified user devices 202 which subscribe to the third-party service. For example, the interactive engagement platform 212 may identify one hundred user devices 202 which are subscribed to the Yahoo Fantasy Football service. The SDK/API server 218 may transmit a data payload associated with the specific action to the content provider apps 204 of the one hundred user devices 202.

In a step 810, the user devices 202 which received the data payload display information/data associated with the data payload in the graphical user interface 108. For example, the one hundred user devices 202 may display a notification in a small interactive content window 111 which alerts the users that Player 1 scored a touchdown, and therefore scored Yahoo Fantasy Football points.

It is noted herein that by querying, filtering, or searching a database or server (e.g., registration server 222) for user devices 202 which are subscribed to livestreams related to specific content/third-party APIs 208, the interactive engagement platform 212 may be configured to provide notifications, alerts, and other data to users which is tailored to each user's own tastes and subscriptions. Further, it is noted herein that the livestreams may include any livestream known in the art including, but not limited to, a fantasy sports league livestream, a sporting league livestream, a gambling (or betting) service livestream, or the like.

Figure 9:
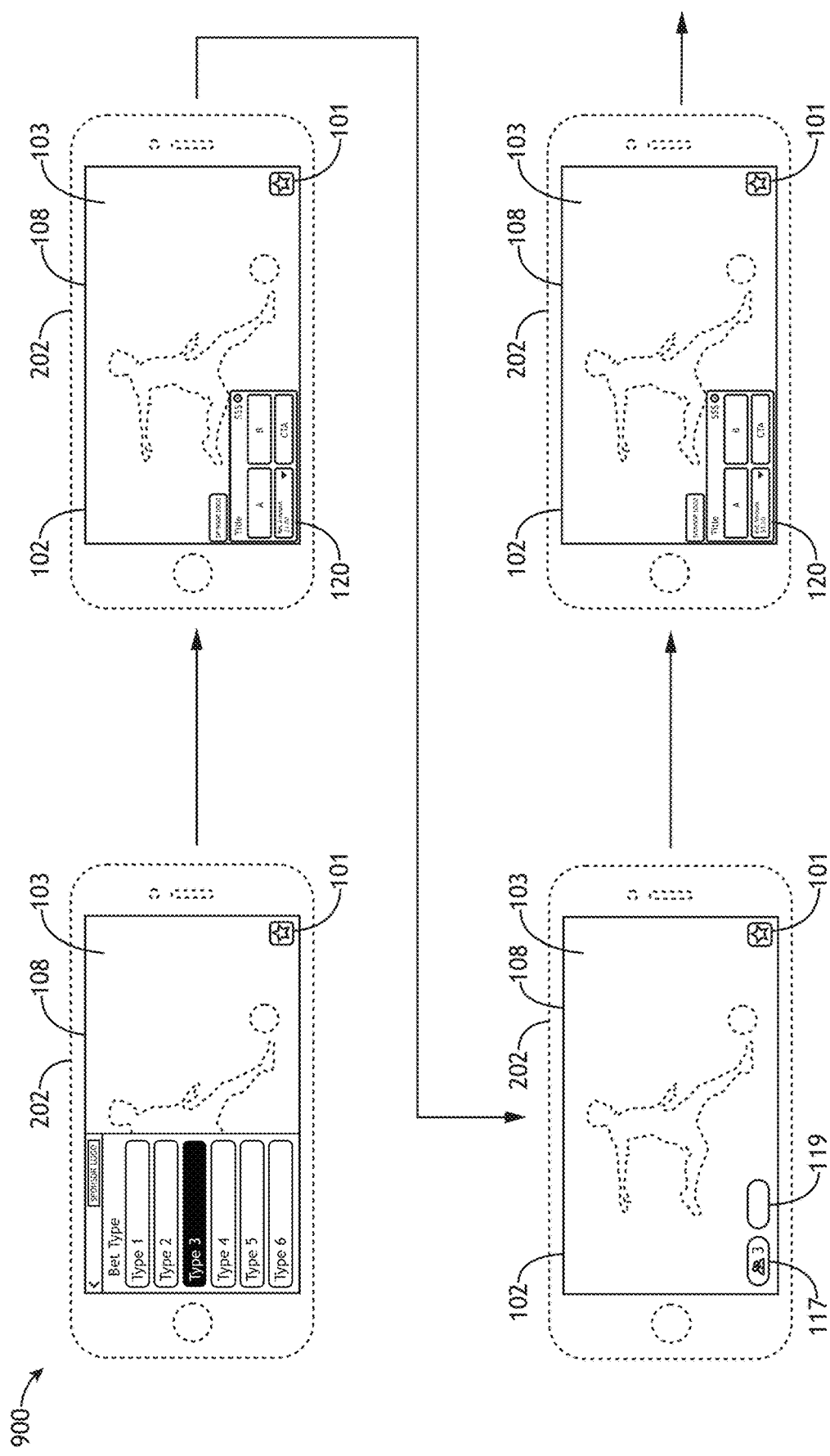
FIG. 9 illustrates a series of interactive content overlays on a graphical user interface depicting repeatable betting opportunities, in accordance with one or more embodiments of the present disclosure.
Figure 9:
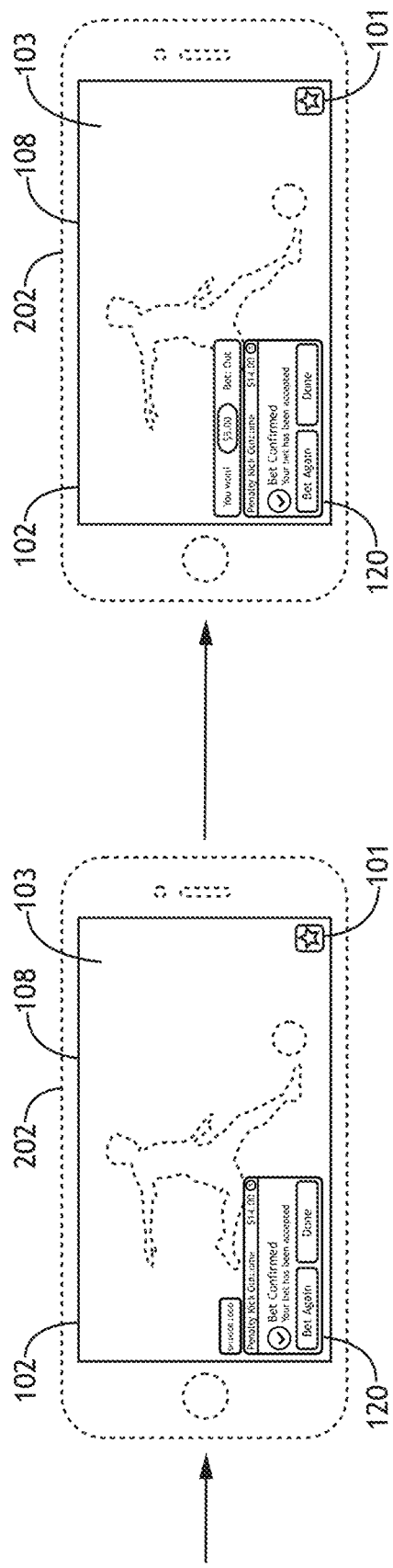

FIG. 9 illustrates a series of interactive content overlays 900 on a graphical user interface depicting repeatable betting opportunities, in accordance with one or more embodiments of the present disclosure.

The interactive content overlay 102 may include a list of one or more types of prediction or betting (e.g., gambling) opportunity types, as well as stats related to the prediction or betting scenario presented. The list of betting opportunity types may include a list of types of betting opportunity types which are related to the video content currently being viewed. For example, the list of one or more betting opportunity types may include a list of one or more repeatable betting opportunities. For instance, in the context of a football game, repeatable betting opportunity types may include, but are not limited to, whether the next play is a run or pass, a bet on the result of the upcoming play (e.g., first down, loss of yards, touchdown), an over/under bet on the next play, the result of the drive, and the like. Upon selection of one of the betting opportunity types, a repeatable bet overlay 120 may appear. The repeatable bet overlay 120 may be semi-persistent and may allow a user to select one or more bets associated with the repeatable bet (e.g., Bet A, Bet B), as well as a wagering amount. For example, if a user selected a run/pass betting opportunity, the repeatable bet overlay 120 may include a first bet (e.g., Bet A) for a run, a second bet (e.g., Bet B) for a pass, and the means to select a gambled amount. Upon finalization of the repeatable bet, one or more controls signals are sent from the mobile device (e.g., user device 202) to servers associated with one or more third party betting services (e.g., Bet 365, Bovada, SkyBet, Betwin) so that the bet may be locked-in.

In embodiments, the interactive content overlay 102 including the list of one or more types of betting opportunity types may be updated in real time or near-real time in conjunction with the video program currently being viewed. By displaying repeatable betting opportunities in real time or near-real time, users may be able to have a more immersive and engaging experience, with the ability to place bets regarding the viewed video program in real time.

Figure 10:
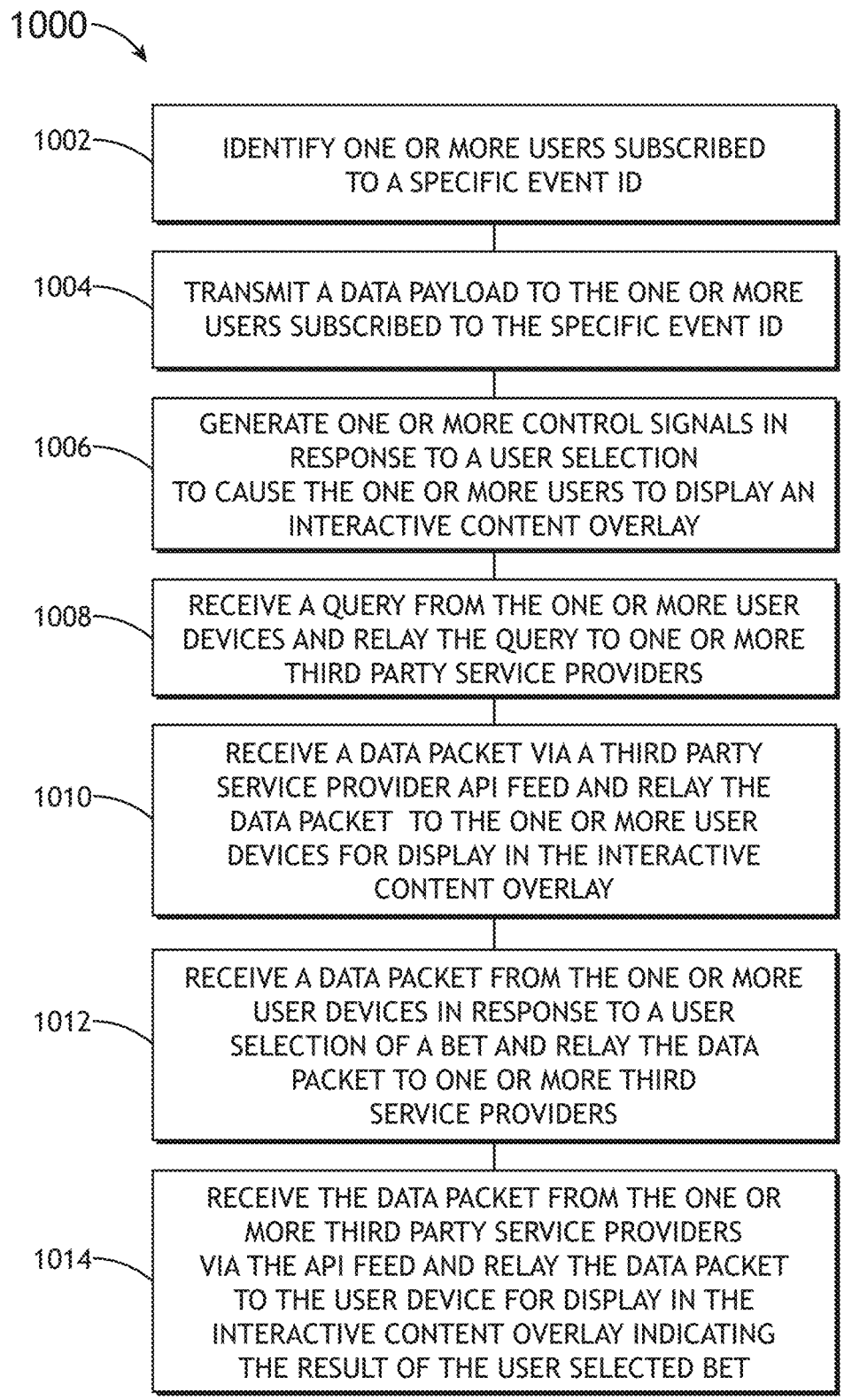
FIG. 10 illustrates a flowchart depicting a method for generating a series of interactive content overlays on a graphical user interface depicting repeatable betting opportunities, in accordance with one or more embodiments of the present disclosure.

FIG. 10 illustrates a flowchart depicting a method 1000 for generating a series of interactive content overlays on a graphical user interface depicting repeatable prediction or betting opportunities, in accordance with one or more embodiments of the present disclosure. It is noted herein that the steps of method 1000 may be implemented all or in part by system 200. It is further recognized, however, that the method 1000 is not limited to the system 200 in that additional or alternative system-level embodiments may carry out all or part of the steps of method 1000.

In a step 1002, the interactive engagement platform 212 identifies one or more users (e.g., user devices 202) subscribed to a specific Event ID. For example, the interactive engagement platform 212 may identify one or more users who are subscribed to a particular livestream. The livestream may be identified by the specific Event ID. For instance, the interactive engagement platform 212 may identify one or more who users who are subscribed to the Yankees vs Dodgers livestream.

In a step 1004, the interactive engagement platform 212 transmits a data payload to the one or more identified user devices subscribed to the specific Event ID. For example, the interactive engagement platform 212 may transmit a data payload to the one or more users identified in step 1002. For instance, the interactive engagement platform 212 may transmit a data payload to one or more users who are subscribed to the Yankees vs Dodgers livestream.

In a step 1006, the interactive engagement platform 212 generates one or more control signals in response to a user selection to cause the one or more identified user devices to display a first interactive content overlay. For example, the interactive engagement platform 212 may cause the one or more identified user devices to display a semi-persistent betting overlay.

In a step 1008, the interactive engagement platform 212 receives a data query from the user device and relays the query to one or more third party service providers via an API feed. For example, the interactive engagement platform 212 may receive a data query from the user device and relay the query to one or more third party betting service providers via an API feed. By way of another example, the interactive engagement platform 212 may receive a data query from the user device and relay the query to one or more third party statistic service providers via an API feed. It is noted herein the one or more third party service providers may include any free to play service provider including, but not limited to, fantasy league service providers, trivia game service providers, sporting league service providers, gambling (or betting) service providers, stats service providers, or the like.

In a step 1010, the interactive engagement platform 212 receives a data packet via the third party service provider API feed and relays the data packet to the user devices 202 for display in a second interactive content overlay (e.g., the semi-persistent betting overlay). For example, the second interactive content overlay may include a list of one or more predictions or betting type opportunities, as well as statistics relevant to the betting type opportunity.

In a step 1012, the interactive engagement platform 212 receives a data packet from the user device in response to a user selection of a prediction or bet and relays the data packet to one or more third party service providers via the API feed. For example, the interactive engagement platform 212 may receive the data packet in response to a user selection of a prediction or bet and relay the data packet to one or more third party service providers. By way of another example, the interactive engagement platform 212 may receive the data packet in response to a user selection of a prediction or bet and relay the data packet to one or more third party statistic service providers.

In a step 1014, the interactive engagement platform 212 receives the data packet from the one or more third party service providers via the API feed and relays the data packet to the user device for display in the interactive content overlay (e.g., semi-persistent betting overlay) indicating the result of the user selected bet.

In a step 1016, the interactive engagement platform 212 receives the data packet from the third party service provider via the API feed and relays the data packet to the user device for display in the interactive content overlay (e.g., semi-persistent betting overlay) indicating a new bet opportunity.

Figure 11:
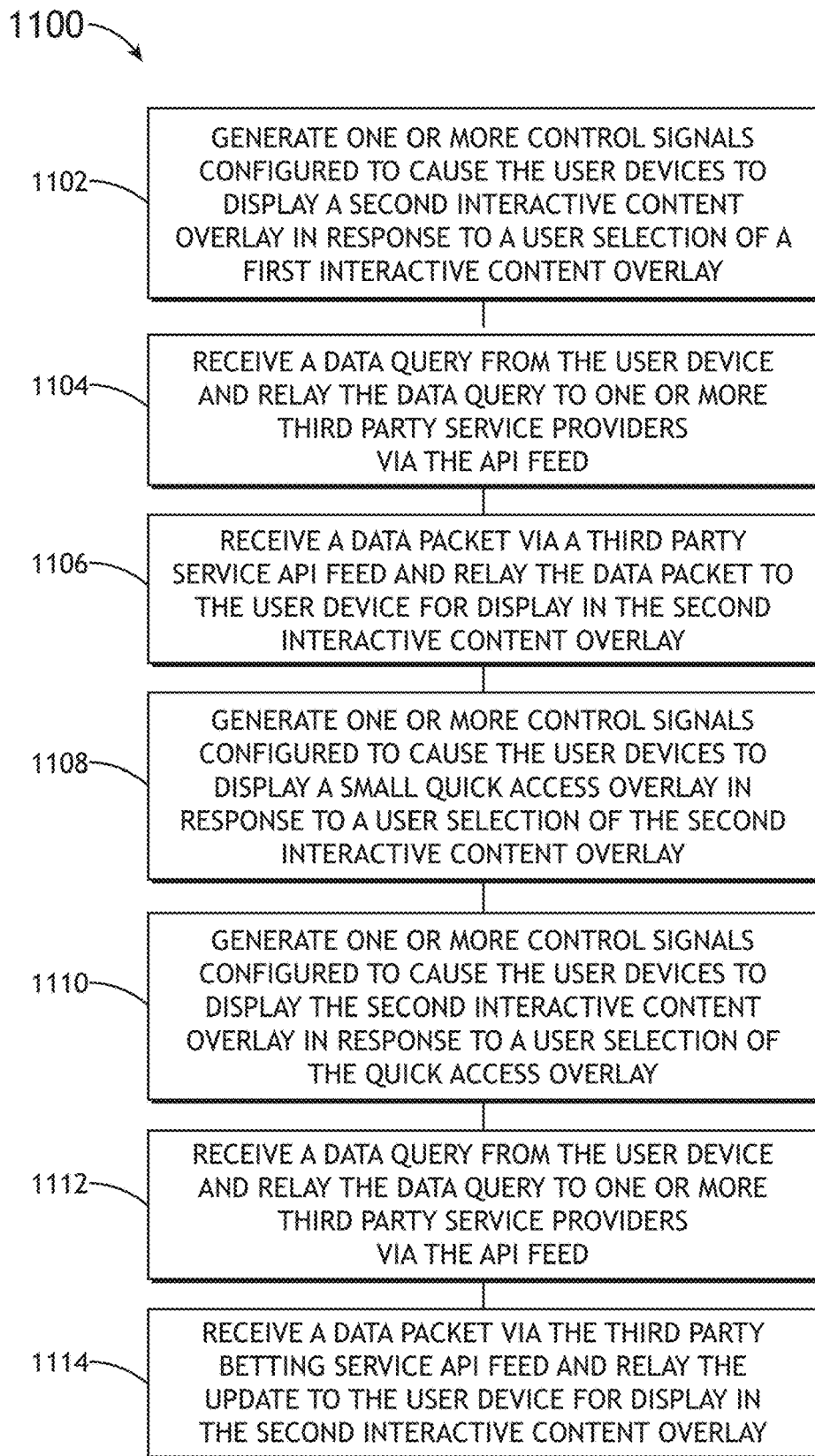
FIG. 11 illustrates a flowchart depicting a method for displaying a series of interactive content overlays on a graphical user interface depicting repeatable betting opportunities, in accordance with one or more embodiments of the present disclosure.

FIG. 11 illustrates a flowchart depicting a method 1100 for displaying a series of interactive content overlays on a graphical user interface depicting repeatable betting opportunities, in accordance with one or more embodiments of the present disclosure. It is noted herein that the steps of method 1100 may be implemented all or in part by system 200. It is further recognized, however, that the method 1100 is not limited to the system 200 in that additional or alternative system-level embodiments may carry out all or part of the steps of method 1100.

In some embodiments, selection of a quick return selectable button 118, as shown and described with respect to FIG. 4, may allow a user to quickly return to a repeatable bet overlay 120 if a user desires to bet the same type of bet multiple times in a row (e.g., bet run/pass for every play of a drive sequence).

In a step 1102, the interactive engagement platform 212 generates one or more control signals configured to cause the user devices 202 to display second interactive content overlay (e.g., semi-persistent betting overlay) in response to a user selection of a first interactive content overlay (e.g., a larger interactive content overlay). For example, an end-user may press a menu button in the first interactive content overlay (e.g., large interactive overlay) to activate the second interactive content overlay (e.g., a semi-persistent betting overlay).

In a step 1104, the interactive engagement platform 212 receives a data query from the user device 202 and relays the data query to one or more third party service providers via the API feed. For example, the interactive engagement platform 212 may be configured to receive a data query from the user device 202 and relay the data query to one or more third party betting service providers via the API feed. It is noted herein the one or more third party service providers may include any free to play service provider including, but not limited to, fantasy league service providers, trivia game service providers, sporting league service providers, gambling (or betting) service providers, stats service providers, or the like.

In a step 1106, the interactive engagement platform 212 receives a data packet via a third party service API feed and relays the data packet to the user device 202 for display in the second interactive content overlay (e.g., semi-persistent betting overlay). For example, the interactive engagement platform 212 may receives a data packet via a third party betting service API feed and relays the data packet to the user device 202 for display in the second interactive content overlay (e.g., semi-persistent betting overlay).

In a step 1108, the interactive engagement platform 212 generates one or more control signals configured to cause the user devices 202 to display a small quick access overlay in response to a user selection of the semi-persistent betting overlay. For example, an end-user may select the semi-persistent overlay (or swipe the semi-persistent overlay off the screen) which generates a small quick access overlay (e.g., quick selectable button).

In a step 1110, the interactive engagement platform 212 generates one or more control signals configured to cause the user devices 202 to display the semi-persistent betting overlay in response to a user selection of the quick access overlay. For example, an end-user may select the quick access overlay which generates the semi-persistent overlay.

In a step 1112, the interactive engagement platform 212 receives a data query from the user device 202 and relays the data query to one or more third party service providers via the API feed. For example, the interactive engagement platform 212 may receive a data query from the user device 202 and relays the data query to one or more third party betting service providers via the API feed.

In step a 1114, the interactive engagement platform 212 receives a data packet via the third party service API feed and relays the update to the user device 202 for display in the semi-persistent betting overlay.

Figure 12:
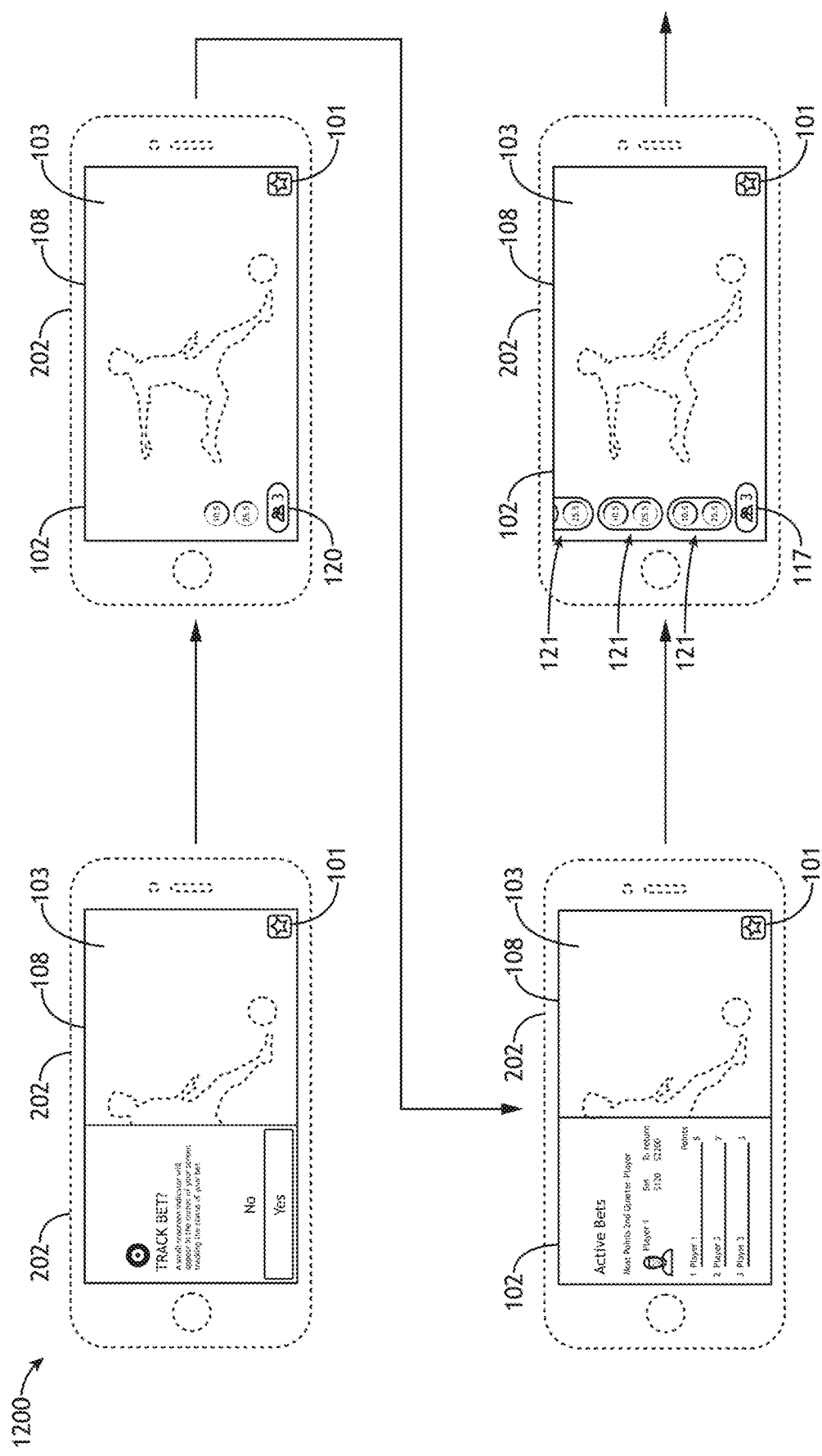
FIG. 12 illustrates a series of interactive content overlays on a graphical user interface depicting bet tracking features, in accordance with one or more embodiments of the present disclosure.
Figure 12:
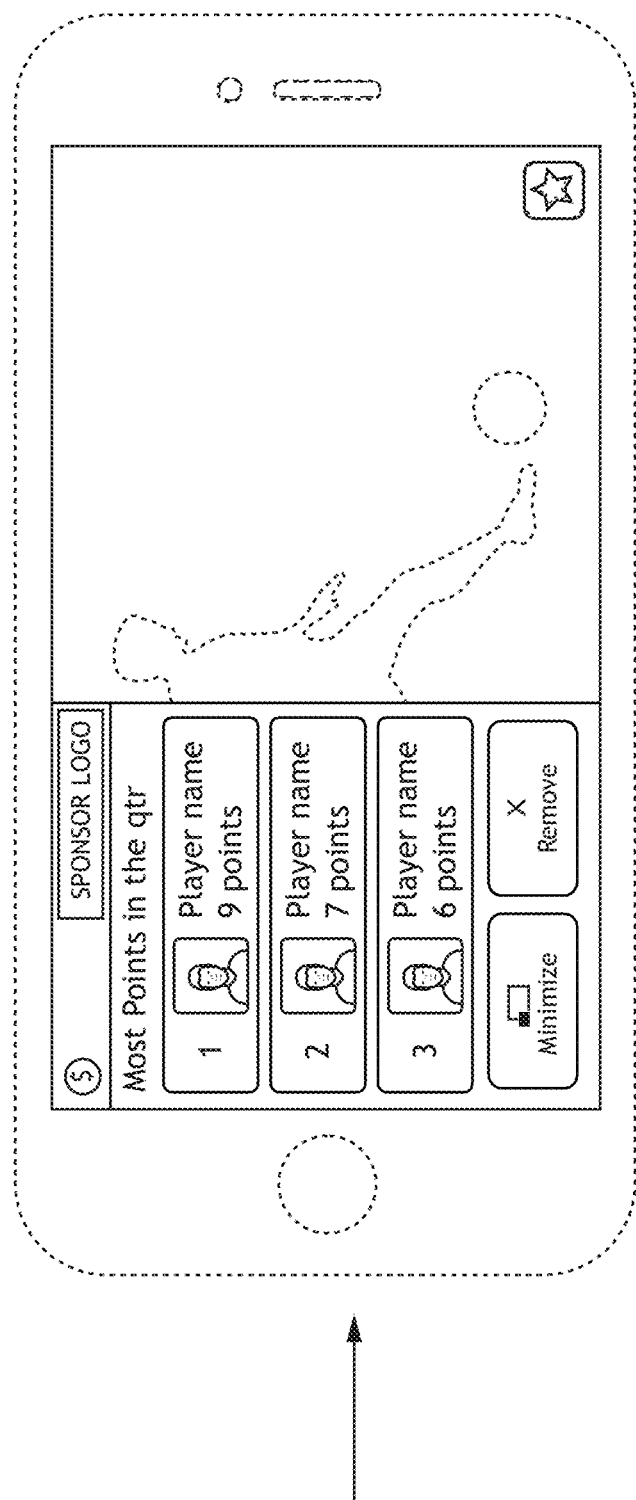

FIG. 12 illustrates a series of interactive content overlays 1200 on a graphical user interface depicting bet tracking features, in accordance with one or more embodiments of the present disclosure.

Some currently available betting opportunities involve the aggregation of stats over a long period of time. For example, a user may be able to bet an over/under on how many points a particular player may have throughout the duration of the game. Currently, there is no efficient way for users to track long-term bets without having to constantly check stats on a separate device. Additionally, some stats, such as how many passes a quarterback has thrown, are not actively/frequently shown during a video program, making these stats difficult to track. Furthermore, users often forget what values (e.g., over/under value, point value) they locked their bets in at, requiring the user to return to the betting service provider to check.

In this regard, embodiments of the present disclosure are directed to an interactive content overlay 102 which allows for bet tracking. For example, as shown in FIG. 12, a user may be able to enable bet tracking. After bet tracking has been enabled, one or more semi-persistent bet tracking indicators 121 may appear. The bet tracking indicators 121 may display the value associated with active bets, as well as an indication regarding the current state of the active bets. For example, while viewing a basketball game, a user may have a first active bet stating a first player will have more than 10.5 points, and a second active bet stating a second player will have more than 15.5 points. In this example, the one or more bet tracking indicators 121 may show the bet values (e.g., 10.5, 15.5), as well as a current state of the active bets (e.g., how close the bet is to paying out). By integrating with, and receiving data from, one or more third party betting operators and one or more third party real-time statistics providers, the bet tracking indicators 121 may be generated and updated in real time or near-real time in order to reflect the current state of the bets as the first player and the second player score points. The bet tracking indicators 121 may animate, activate, trigger notifications, or the like, when the status of the bet tracking indicator changes (e.g., when the first or second player scores points). It is noted herein the one or more third party service providers may include any free to play service provider including, but not limited to, fantasy league service providers, trivia game service providers, sporting league service providers, gambling (or betting) service providers, stats service providers, or the like.

Selection of one of the bet tracking indicators may pull up details regarding the selected active bet and/or additional active bets. If a user has a plurality of active bets, the one or more bet tracking indicators 121 may be displayed on the screen and may be scrolled such that a user may scroll through all the bet tracking indicators 121 associated with all the active bets of the user. In the event an active bet has been won or lost in the middle of a video program (e.g., an active bet betting on the number of yards of Player 1 in the first half), bet tracking indicator 121 may animate, activate a larger animated display involving part or all of the screen, or disappear indicating a conclusion of the bet.

Figure 13:
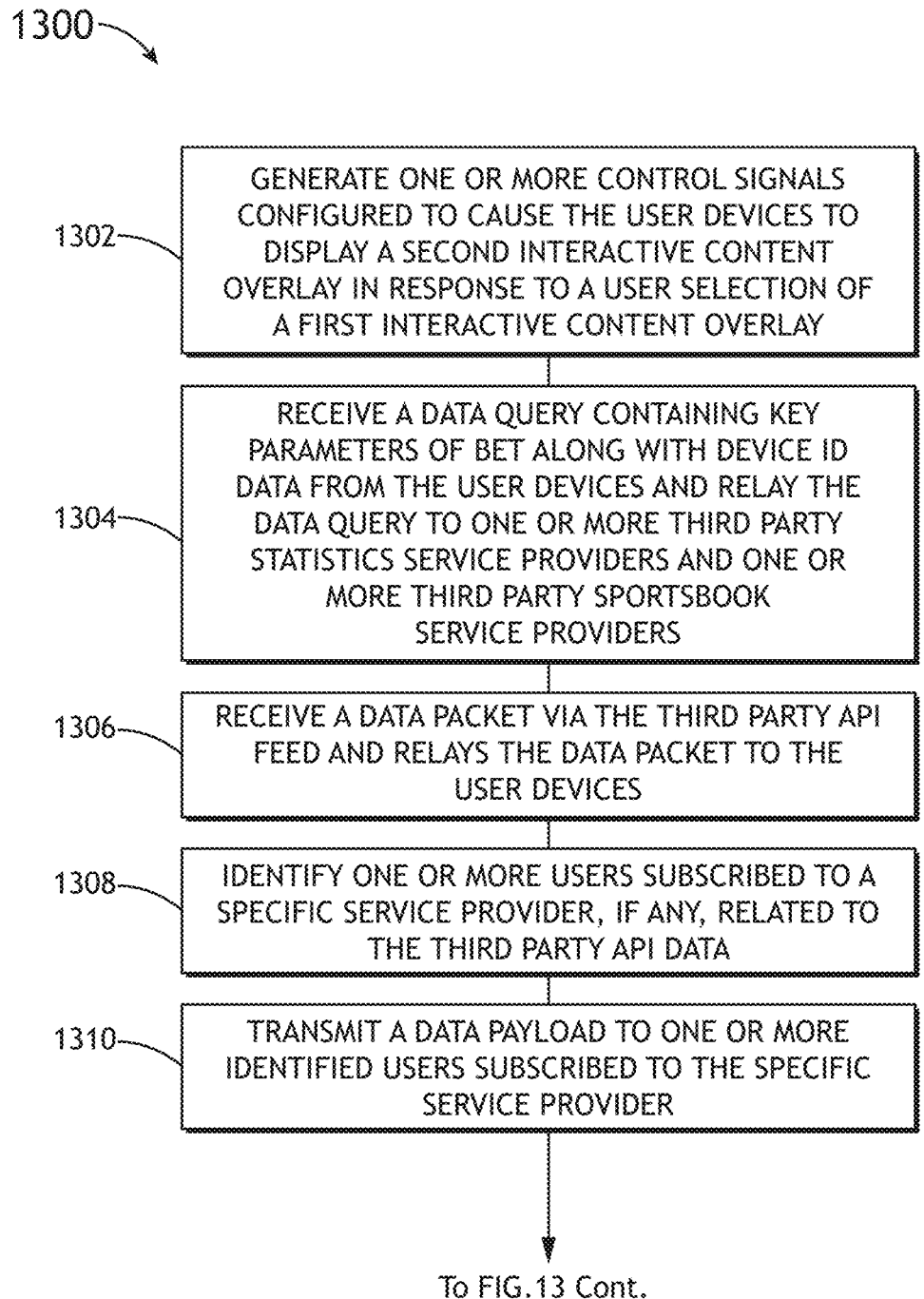
FIG. 13 illustrates a flowchart depicting a method for generating a series of interactive content overlays on a graphical user interface depicting bet tracking features, in accordance with one or more embodiments of the present disclosure.
Figure 13:
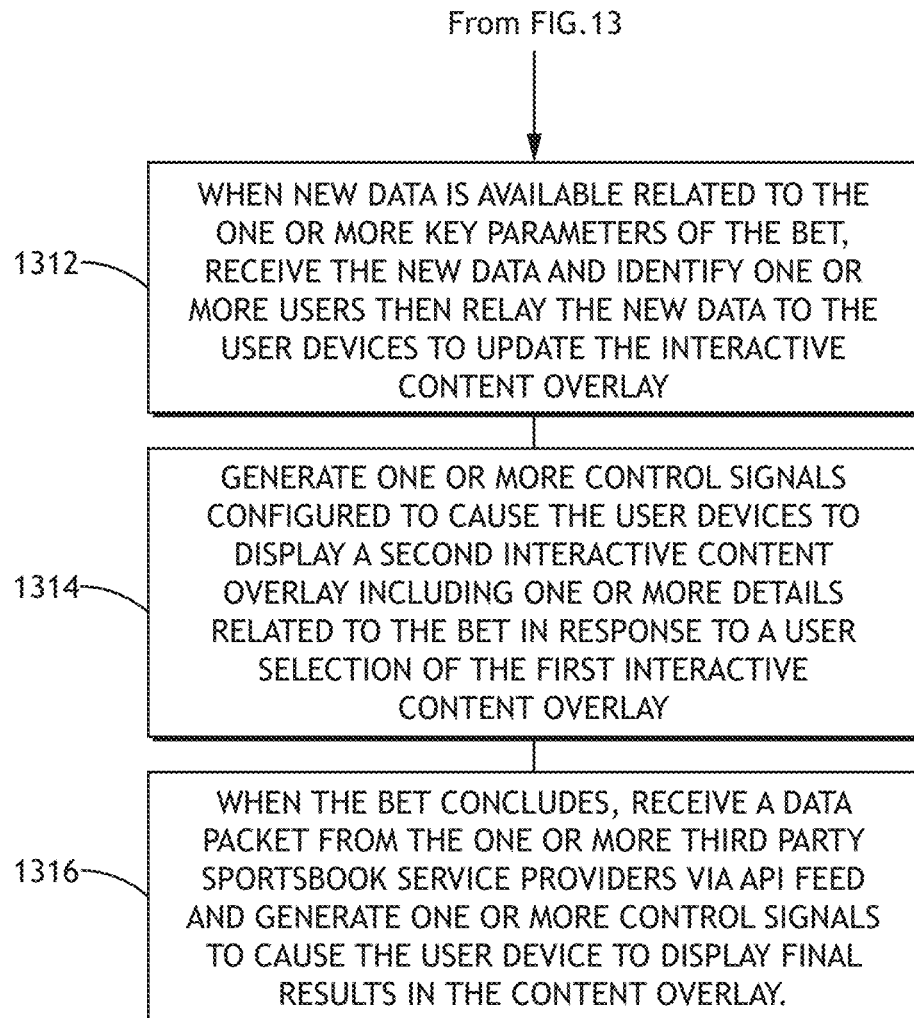

FIG. 13 illustrates a flowchart depicting a method 1300 for generating a series of interactive content overlays on a graphical user interface depicting bet tracking features, in accordance with one or more embodiments of the present disclosure. It is noted herein that the steps of method 1300 may be implemented all or in part by system 200. It is further recognized, however, that the method 1300 is not limited to the system 200 in that additional or alternative system-level embodiments may carry out all or part of the steps of method 1300.

In a step 1302, the interactive engagement platform 212 generates one or more control signals configured to cause the user devices 202 to display second interactive content overlay (e.g., semi-persistent bet tracking overlay) in response to a user selection of a first interactive content overlay (e.g., a larger interactive content overlay). For example, an end-user may press a menu button in the first interactive content overlay (e.g., large interactive overlay) to activate the second interactive content overlay (e.g., a semi-persistent bet tracking overlay).

In a step 1304, the interactive engagement platform 212 receives a data query containing key parameters of bet along with Device ID data from the user devices 202. The interactive engagement platform 212 then relays the data query to at least one of a third party statistics service provider, a third party sportsbook service provider, or the like via the API feed. It is noted herein the one or more third party service providers may include any free to play service provider including, but not limited to, fantasy league service providers, trivia game service providers, sporting league service providers, gambling (or betting) service providers, stats service providers, or the like.

In a step 1306, the interactive engagement platform 212 receives a data packet via the third party API feed and relays the data packet to the user devices. For example, the interactive engagement platform 212 may generate one or more control signals to cause the user device to display a summary of the data packet in the semi-persistent content overlay.

In a step 1308, the interactive engagement platform 212 identifies one or more users (e.g., user devices 202) subscribed to a specific service provider, if any, related to the third party API data (e.g., data from the third party betting service provider, the third party sportsbook service provider, or the like).

In a step 1310, the interactive engagement platform 212 transmits a data payload to one or more identified users (e.g., user devices 202) subscribed to the specific service provider.

In a step 1312, when new data is available related to the one or more key parameters of the bet, the interactive engagement platform 212 receives the new data and identifies one or more users (e.g., user devices 202) and relays the new data to the user devices 202 to update first interactive content overlay.

In a step 1314, the interactive engagement platform 212 generates one or more control signals configured to cause the user devices 202 to display a second interactive content overlay (e.g., large interactive content overlay) including one or more details related to the bet in response to a user selection of the first interactive content overlay.

In a step 1316, when the bet concludes (e.g., time has lapsed on the bet), the interactive engagement platform 212 receives a data packet from the one or more third party SportsBook service providers via API feed and generates one or more control signals to cause the user device 202 to display (or post) final results in the content overlay.

Figure 14:
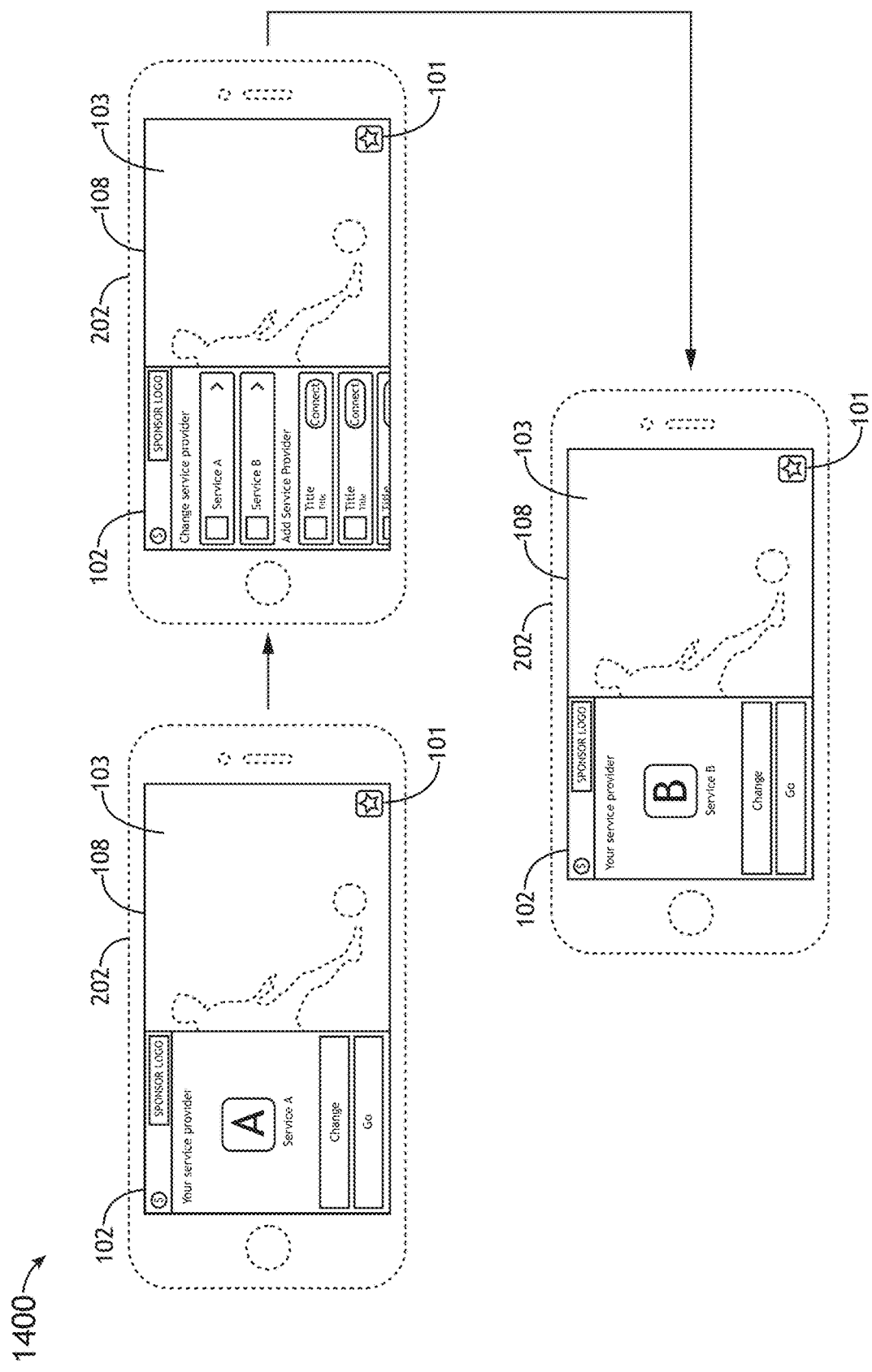
FIG. 14 illustrates a series of interactive content overlays on a graphical user interface depicting service provider selection, in accordance with one or more embodiments of the present disclosure.

FIG. 14 illustrates a series of interactive content overlays 1400 on a graphical user interface depicting service provider selection and/or fantasy service provider selection, in accordance with one or more embodiments of the present disclosure.

It is noted herein that some users may have gambling "accounts," electronic wallets, or the like, with a plurality of service providers (e.g., betting service providers, fantasy league service providers, or the like). There are numerous online betting service providers through which a user may place bets including, but not limited to, Bet365, Bovada, SkyBet, Betwin, and the like. Similarly, there are numerous online fantasy service providers through which users may manage fantasy teams including, but not limited to, Yahoo-Fantasy, NFL Fantasy Football, ESPN Fantasy Football, and the like. In some embodiments, a user's mobile device (e.g., smartphone, tablet, and the like) may be configured to interface with a plurality of betting service providers and/or fantasy service providers such that the interactive content overlay 102 shown on the user device may allow a user to place bets through the respective betting service providers via the interactive content overlay 102 and/or view/manage fantasy teams hosted by the respective fantasy service providers. In some embodiments, the interactive content overlay 102 may enable a user to quickly and efficiently switch between multiple betting service providers and/or multiple fantasy service providers to which the user is integrated/subscribed.

For example, as shown in FIG. 14, an interactive content overlay 102 may indicate which betting service provider and/or fantasy service provider is currently active/enabled. The interactive content overlay 102 may include one or more selectable buttons configured to allow a user to continue using the current betting service provider and/or fantasy service provider, as well as one or more selectable buttons configured to allow a user to change betting service providers and/or fantasy service providers. For instance, upon selection of the selectable button labeled "Go," the interactive content overlay 102 may show content related to the current betting/fantasy service provider such that a user may place bets with the current betting service provider, view fantasy teams hosted by the current fantasy service provider, and the like. Conversely, upon selection of the selectable button labeled "Change," the interactive content overlay 102 may show a list of one or more betting/fantasy service providers. The list of one or more betting/fantasy service providers may include one or more betting/fantasy service providers to which the user is already subscribed, as well as one or more betting/fantasy service providers which the user may add and/or begin subscribing/engaging with. The user may then be able to select another betting/fantasy service provider to begin engaging with the new betting/fantasy service provider.

It is noted herein that there is currently no efficient way to quickly and easily transition between betting service providers and/or fantasy service providers. By providing an interactive content overlay 102 which allows users to quickly transition between service providers, embodiments of the present disclosure may enhance the overall experience for end-users.

Although FIGS. 9-14 and the related discussions discuss one or more interactive content overlays and components thereof in the context of betting and/or betting service providers, it is noted herein that the one or more interactive content overlays may be directed to any interactive content overlay for free to play services including, but not limited to, fantasy league, trivia games, sporting leagues, gambling (or betting), stats, or the like.

Figure 15:
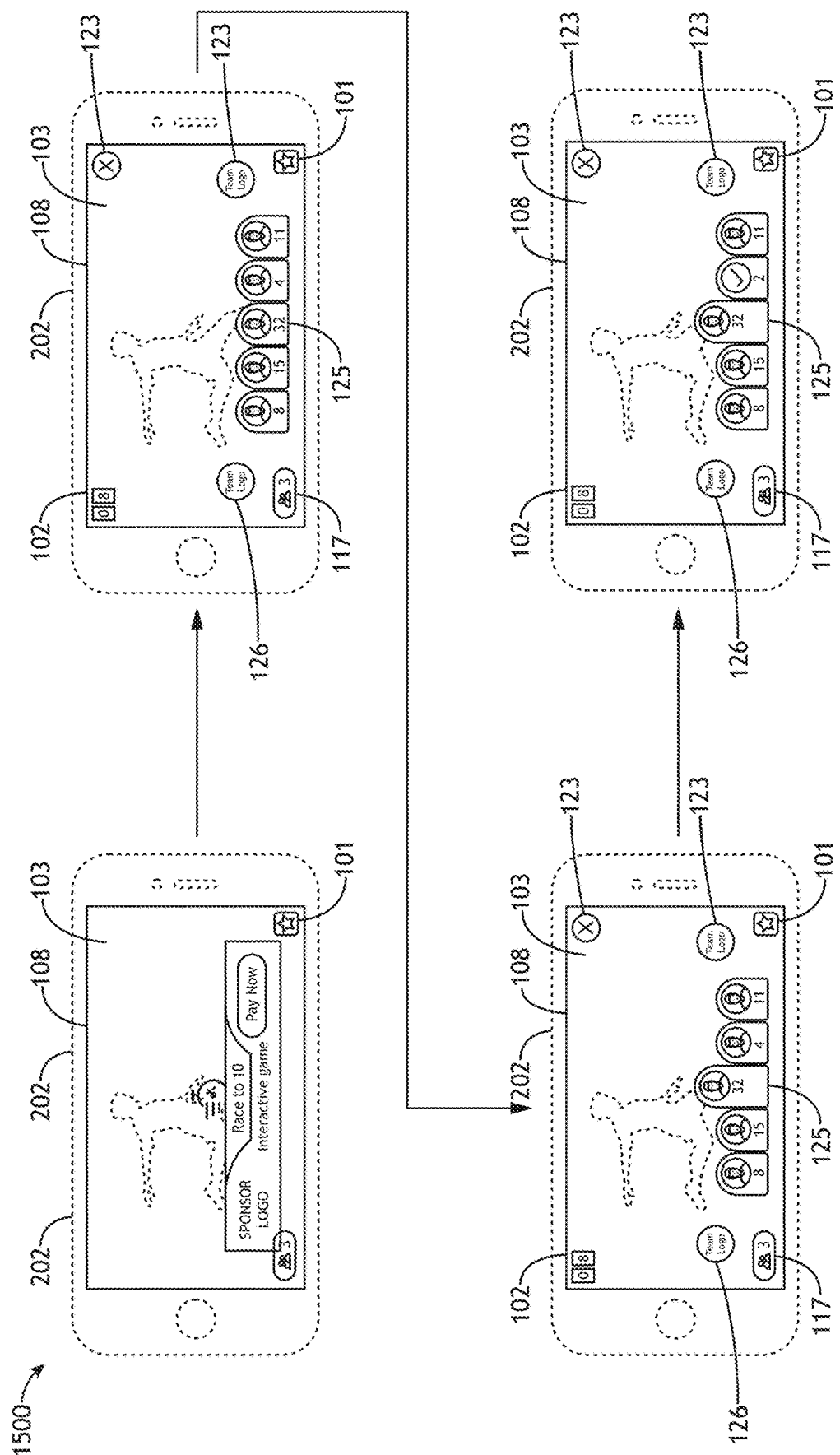
FIG. 15 illustrates a series of interactive content overlays on a graphical user interface depicting an in-play interactive game, in accordance with one or more embodiments of the present disclosure.

FIG. 15 illustrates a series of interactive content overlays 1500 on a graphical user interface depicting an in-play interactive game, in accordance with one or more embodiments of the present disclosure.

Some children, and even some adults, often become side-tracked or bored during the duration of a video program, such as a basketball game. Currently, there are no interactive engagement features aimed to increase user interaction and engagement with the displayed video program. Additionally, while many users may remain engaged throughout the duration of a video program, there are currently no interactive engagement features which allow the users to remain engaged with the video program while simultaneously engaging with other users or friends.

In this regard, some embodiments of the present disclosure are directed to in-play interactive games which may increase user engagement/interaction during a video program. In-play interactive games may include interactive games/contests associated with the video content currently being viewed. For example, while watching a basketball game with other users/contacts, users may be able to engage in an in-play interactive game in which each user selects a player which they believe will score the next basket, with the winner being the first to ten points.

For instance, as shown in FIG. 15, an interactive content overlay may include an in-play interactive game invitation 104. The in-play interactive game invitation 104 may be sponsored by an entity/company. Additionally, the in-play interactive game invitation 104 may be generated automatically such that the user is simply playing for fun or playing "against" a computer. Additionally and/or alternatively, the in-play interactive game invitation 104 may be sent by another user/contact who is currently viewing the video program such that multiple users may play against one another. Upon accepting the in-play interactive game invitation 104, an in-play interactive game overlay including an interactive game scoreboard 124, an interactive game player selector 125, and interactive game team toggles 126 may appear. Two separate in-play interactive game overlays 126 including team logos for each team may also appear. To play the game, a user may be able to select a player shown in the in-play interactive game overlay 125 which the user believes will score the next basket of the game. If the user selects correctly, they receive the number of points associated with that basket, and their score within the in-play interactive game may increase accordingly, as shown via the interactive game scoreboard 124.

The user device including the in-play interactive game may be communicatively coupled, via system 200, to one or more real-time stats engines such that scores for the in-play interactive game may be kept in real time and/or near-real time.

It is noted herein that the in-play interactive game disclosed herein is provided solely for illustration. In this regard, it is noted herein that any in-play interactive games may be shown/played via an interactive content overlay without departing from the spirit and scope of the present disclosure.

Figure 16:
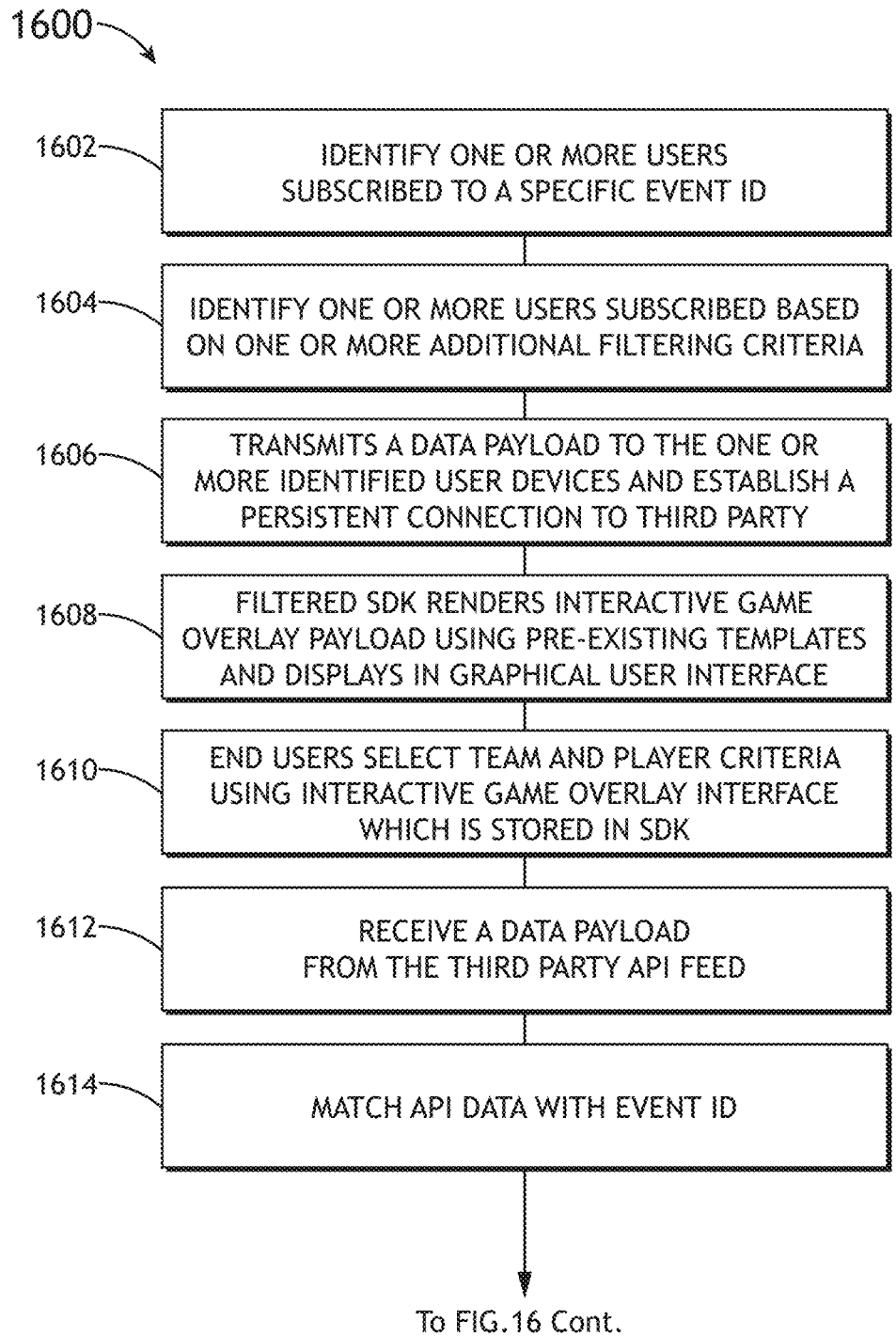
FIG. 16 illustrates a flowchart depicting a method for generating a series of interactive content overlays on a graphical user interface depicting an in-play interactive game, in accordance with one or more embodiments of the present disclosure.
Figure 16:
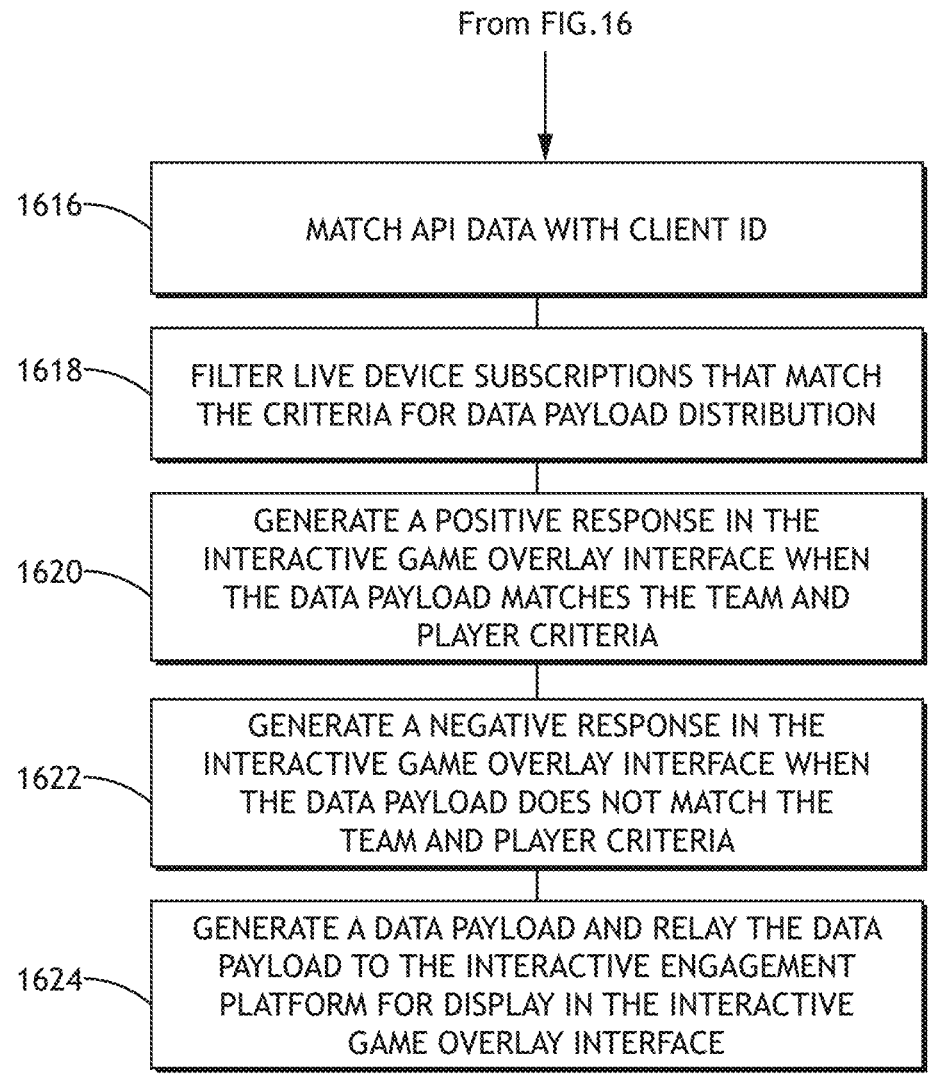

FIG. 16 illustrates a flowchart depicting a method 1600 for generating a series of interactive content overlays on a graphical user interface depicting an in-play interactive game, in accordance with one or more embodiments of the present disclosure. It is noted herein that the steps of method 1600 may be implemented all or in part by system 200. It is further recognized, however, that the method 1600 is not limited to the system 200 in that additional or alternative system-level embodiments may carry out all or part of the steps of method 1600

In a step 1602, the interactive engagement platform 212 identifies one or more users (e.g., user devices 202) subscribed to a specific Event ID.

In a step 1604, the interactive engagement platform 212 identifies one or more users (e.g. user devices 202) subscribed based on one or more additional filtering criteria. For example, the interactive engagement platform 212 may identify one or more user devices based on if a user participated in a sponsor promotion.

In a step 1606, the interactive engagement platform 212 transmits a data payload to the one or more identified user devices and establishes a persistent connection to third party statistical API.

In a step 1608, the interactive engagement platform 212 renders an interactive game overlay payload using pre-existing templates and displays in graphical user interface 108. For example, the interactive engagement platform 212 may include one or more templates stored in memory. In this regard, the interactive engagement platform 212 may use the one or more templates stored in memory to display one or more interactive games including one or more buttons, scoreboard graphics, or the like.

In a step 1610, end user selects a team and player criteria using interactive game overlay interface which is stored in SDK.

In a step 1612, the interactive engagement platform 212 receives a data payload from the third party API feed.

In a step 1614, the analysis system 234 matches API data with Event ID.

In a step 1616, the analysis system 234 matches API data with Client ID.

In a step 1618, the interactive engagement platform 212 filters live device subscriptions that match the criteria for data payload distribution.

In a step 1620, when data payload matches the team and player criteria stored in the SDK, a positive response is generated in the interactive game overlay interface.

In a step 1622, when data payload does not match the team and player criteria stored in the SDK, a negative response is generated in the interactive game overlay interface.

In a step 1624, when a positive response number is generated such that a threshold is reached, the SDK generates a data payload and relays the data payload to the interactive engagement platform 212 for display in the interactive game overlay interface.

Figure 17:
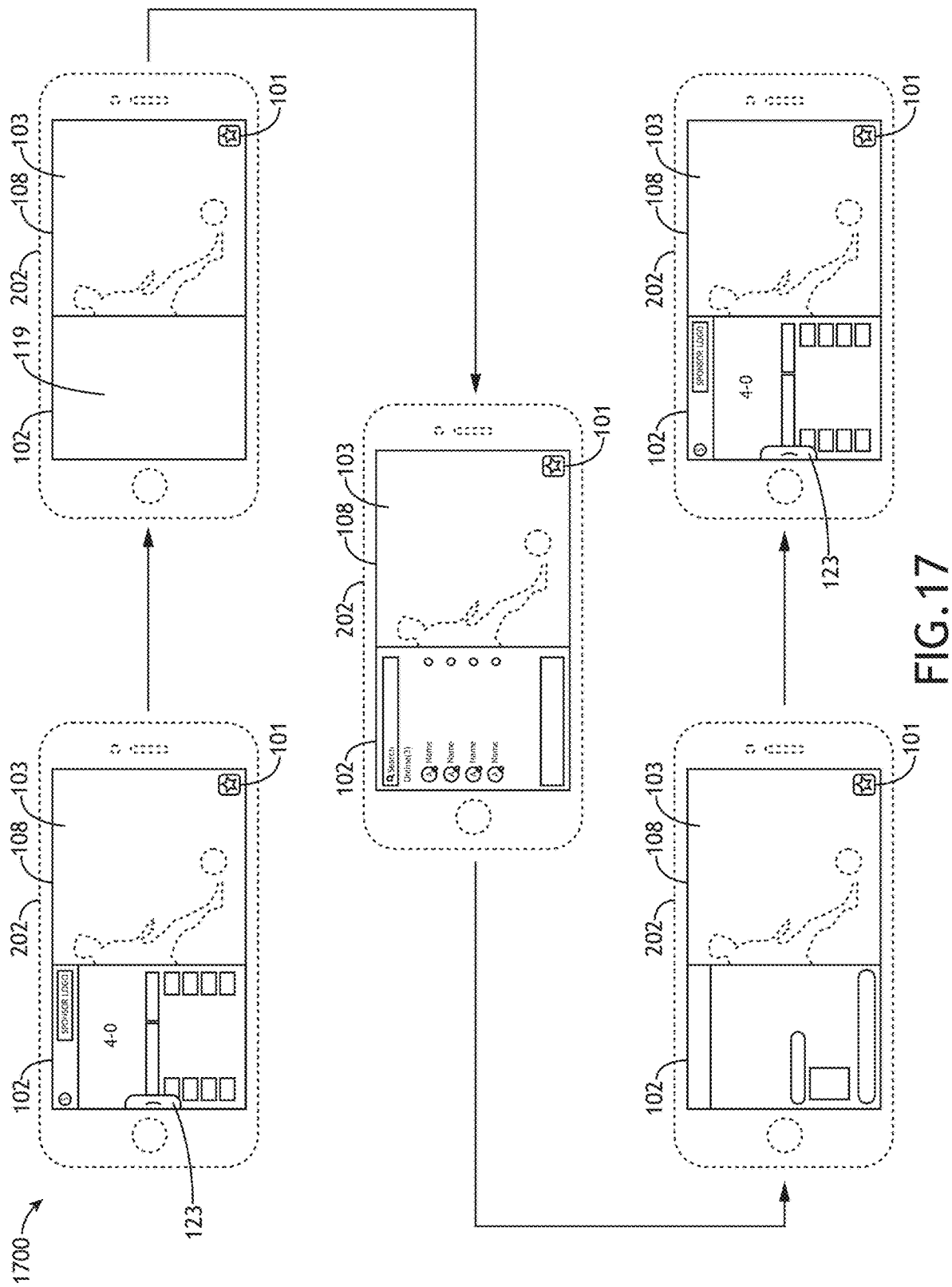
FIG. 17 illustrates a series of interactive content overlays on a graphical user interface depicting an interactive content overlay sharing feature, in accordance with one or more embodiments of the present disclosure.

FIG. 17 illustrates a series of interactive content overlays 1700 on a graphical user interface depicting an interactive content overlay sharing feature, in accordance with one or more embodiments of the present disclosure.

In embodiments, a user may be able to share an interactive content overlay 102 directly with one or more users. By allowing users to share an interactive content overlay 102 directly with other users, embodiments of the present disclosure may enable the efficient flow of information, and allow groups of users to know they are viewing the same content. Additionally, allowing users to users to share an interactive content overlay 102 directly with other users prevents the need for one user to give another user step-by-step instructions to lead them to the same interactive content overlay 102 they are currently viewing.

For example, as shown in FIG. 17, a user watching a Minnesota Vikings/Philadelphia Eagles football game may be viewing an interactive content overlay 102 displaying game stats for each team. In order to share the interactive content overlay 102 with another user, the user may swipe a swipe grab indicator 114. Upon swiping the swipe grab indicator 114, the user may then be able to search and/or select one or more contacts from a list of contacts with which to share the interactive content overlay 102. The user may then start a chat with one or more users, and share the interactive content overlay 102 within the chat. The users within the chat may then be able to select the shared interactive content overlay 102, which will display the interactive content overlay 102 on their respective user devices.

Figure 18:
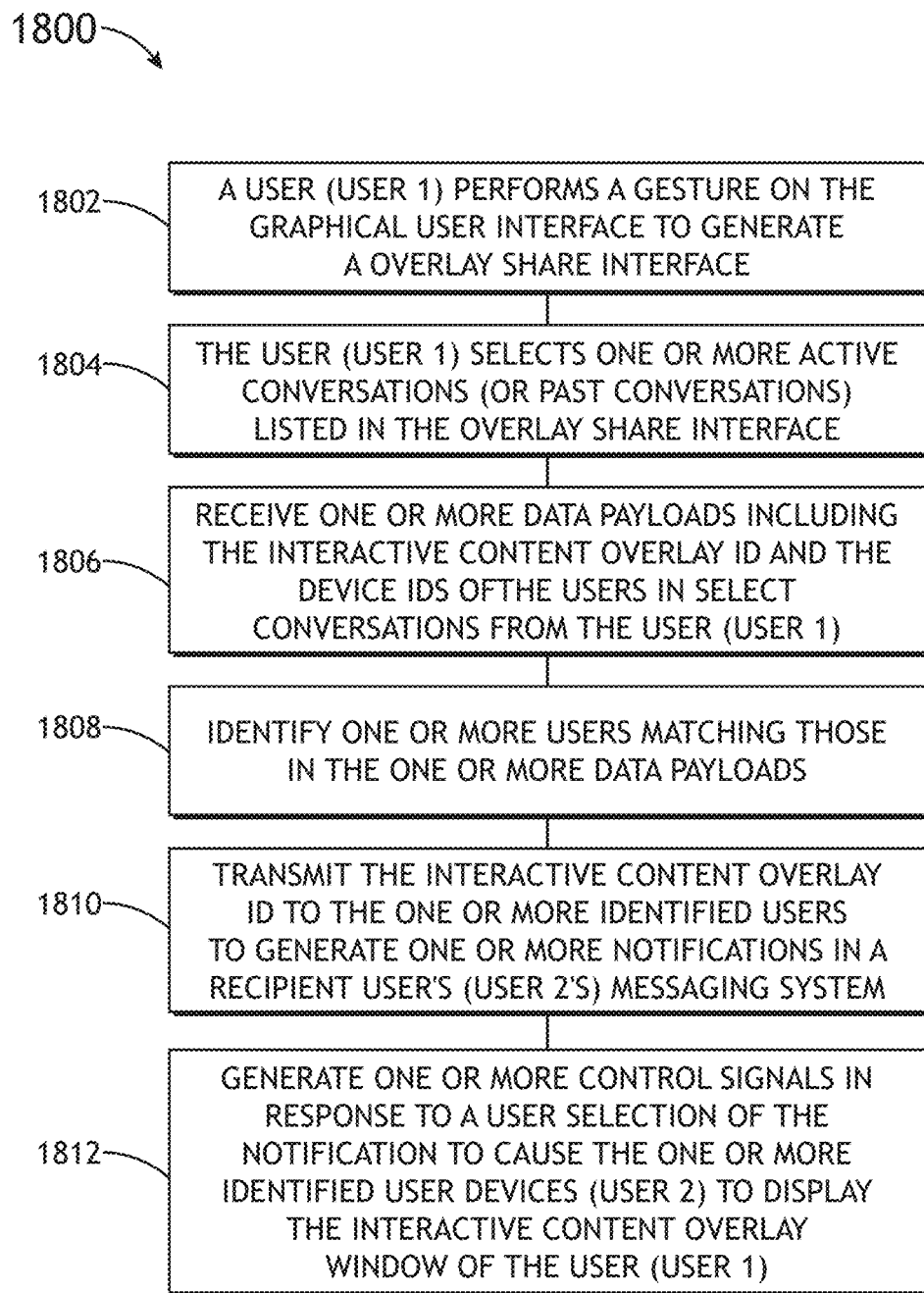
FIG. 18 illustrates a flowchart depicting a method for generating a series of interactive content overlays on a graphical user interface depicting an interactive content overlay sharing feature, in accordance with one or more embodiments of the present disclosure.

FIG. 18 illustrates a flowchart depicting a method 1800 for generating a series of interactive content overlays on a graphical user interface depicting an interactive content overlay sharing feature, in accordance with one or more embodiments of the present disclosure. It is noted herein that the steps of method 1800 may be implemented all or in part by system 200. It is further recognized, however, that the method 1800 is not limited to the system 200 in that additional or alternative system-level embodiments may carry out all or part of the steps of method 1800.

In one embodiment, method 1800 may be used to allow a user to easily and instantly share an interactive content overlay window 102 with one or more additional users.

In a step 1802, a user (User 1) performs a gesture on the graphical user interface 108 in order to generate an overlay share interface window (e.g., interactive content overlay window 102) in the graphical interface 108. For example, User 1 may select a share button within the graphical user interface 108.

In a step 1804, the user (User 1) selects one or more active conversations (or past conversations) listed in the overlay share interface window with which to share. For example, User 1 may select a conversation including a user (e.g., User 2) with which to share the interactive content overlay window 102. User 1 may then select a "send" button, or otherwise cause a request to be sent to User 2.

In a step 1806, the user device 202 of the user (User 1) transmits one or more data payloads to the interactive engagement platform 212. The one or more data payloads may include a request to share the content overlay window 102, a data payload containing the interactive content overlay ID, and the Device IDs of one or more users in the selected conversations (e.g., User 2).

In a step 1808, the interactive engagement platform 212 identifies one or more users (e.g., user devices 202) matching those in the one or more data payloads.

In a step 1810, the interactive engagement platform 212 transmits the interactive content overlay ID to the one or more identified devices. For example, the interactive engagement platform 212 may generate one or more notifications. For instance, the interactive engagement platform 212 may generate one or more thumbnail images in the recipient users' messaging system.

In a step 1812, upon selection of the notification (e.g., thumbnail image), the recipient user device (User 2's device) may be configured to display the interactive content overlay window of the first user device (User 1's device).

As noted previously herein, the system of the present disclosure may include a one or more controllers communicatively coupled to one or more servers via a network. In one embodiment, controllers and/or servers may include one or more processors and memory. In another embodiment, the one or more processors may be configured to execute a set of program instructions stored in memory, wherein the set of program instructions are configured to cause the one or more processors to carry out the steps of the present disclosure.

It is noted herein that the one or more components of system may be communicatively coupled to the various other components of system 100 in any manner known in the art. For example, the one or more components of the system (e.g., servers, controllers, user devices, processors, and the like) may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth, 3G, 4G, 4G LTE, 5G, and the like).

In one embodiment, the one or more processors may include any one or more processing elements known in the art. In this sense, the one or more processors may include any microprocessor-type device configured to execute software algorithms and/or instructions. In one embodiment, the one or more processors may consist of a desktop computer, mainframe computer system, workstation, image computer, parallel processor, or other computer system (e.g., networked computer) configured to execute a program configured to operate the system, as described throughout the present disclosure. It should be recognized that the steps described throughout the present disclosure may be carried out by a single computer system/server or, alternatively, multiple computer systems/servers. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different components/subsystems of the system (e.g., user devices 202, SDK/API server 218, registration server 222, API ingestion system 220, messaging and communications system 228, advertising system 230, and the like) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors. For example, the memory may include a non-transitory memory medium. For instance, the memory may include, but is not limited to, a read-only memory (ROM), a random-access memory (RAM), a magnetic or optical memory device (e.g., disk), a magnetic tape, a solid-state drive and the like. It is further noted that memory may be housed in a common controller housing with the one or more processors. In an alternative embodiment, the memory may be located remotely with respect to the physical location of the processors, servers, controllers, and the like. In another embodiment, the memory maintains program instructions for causing the one or more processors to carry out the various steps described through the present disclosure.

As noted previously herein, the one or more user devices of the present disclosure may include any user device known in the art. In embodiments, a user device may include a user interface. In one embodiment, the user interface may include, but is not limited to, one or more desktops, tablets, smartphones, smart watches, smart TVs, or the like. In another embodiment, the user interface includes a display used to display data of the system to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In another embodiment, a user may input selections and/or instructions responsive to data displayed to the user via the user interface.

As noted previously herein, various components of the system of the present disclosure may be communicatively coupled to one another via a networked configuration. In this regard, components of system may include a network interface. It is noted that a network interface may include any network interface circuitry or network interface device suitable for interfacing with a network. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, WiFi protocols, RF, LoRa, and the like. By way of another example, a network interface may be configured to communicatively couple to a network with a cloud-based architecture. Furthermore, the one or more servers of the present disclosure may include a cloud-based architecture.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for interactive video content, comprising:
one or more interactive engagement platform servers communicatively couplable to a plurality of user devices, wherein the plurality of user devices are configured to display one or more video programs via one or more video program streams received from one or more video provider servers, wherein the one or more interactive engagement platform servers are configured to:
identify one or more user devices of the plurality of user devices subscribed to a specific Event ID, the specific Event ID corresponds to one or more livestreams;
transmit one or more data payloads to the one or more identified user devices subscribed to the specific Event ID corresponding to the one or more livestreams, the one or more data payloads including data related to the one or more video program streams being displayed;
generate one or more control signals in response to a user selection to cause the one or more identified user devices to display a first interactive content overlay;
retrieve a data packet from one or more third party service providers;
generate one or more control signals configured to cause the one or more identified user devices to display a second interactive content overlay including information associated with the retrieved data packet, the information associated with the retrieved data packet including a list of one or more betting type opportunities;
retrieve an additional data packet from the one or more identified user devices, in response to a user selection of a bet from the list of one or more betting type opportunities;
transmit to the user selection of the bet to at least one of the one or more third party service providers;
retrieve from the at least one of the one or more third party service providers a result of the user selected bet; and
generate one or more control signals configured to cause the one or more identified user devices to display a third interactive content overlay including the result of the user selected bet.

2. The system of claim 1, wherein the one or more third party service providers include at least one of:
a third party betting service provider or a third party statistics service provider.

3. The system of claim 1, wherein the interactive engagement platform is further configured to:
retrieve an additional data packet from the one or more third party service provides; and
generate one or more control signals configured to cause the one or more identified user devices to display an additional interactive content overlay configured to display information associated with the retrieved additional data packet, the information associated with the retrieved additional packet including one or more new betting opportunities.

4. The system of claim 1, wherein the at least one of the interactive betting content overlays are semi-persistent.

5. The system of claim 1, wherein the interactive content overlay includes a submenu button set comprising one or more selectable buttons, wherein the one or more interactive engagement platform servers are further configured to generate one or more control signals configured to associate at least one data payload of the one or more retrieved data payloads with at least one selectable button of the submenu button set.

6. The system of claim 5, wherein the one or more control signals are configured to associate a first data payload with a first selectable button, and a second data payload with a second selectable button.

7. The system of claim 6,
wherein selection of the first selectable button is configured to cause the user device to display supplemental content of a first data payload in a first interactive content overlay window,
wherein selection of the second selectable button of the second selectable button is configured to cause the user device to display supplemental content of the second data payload in a second interactive content overlay window, wherein the second interactive overlay content window is different from the first interactive content overlay window.

8. The system of claim 7, wherein the first selectable button is configured to allow a user to change a service provider of the one or more third party service providers.

9. The system of claim 1, wherein the one or more interactive engagement platform servers are configured to:
generate one or more control signals in response to a user selection of the first selectable button to cause the one or more identified user devices to display the second interactive content overlay configured to display the list of one or more third party service providers.

10. The system of claim 7, wherein at least one of the first interactive content overlay window or the second interactive content overlay window is at least partially transparent.

11. A system for interactive video content, comprising:
a user device communicatively coupled to one or more video provider servers and at least one of one or more third-party service providers or one or more third-party content providers, wherein the user device is subscribed to a specific Event ID, wherein the specific Event ID corresponds to the one or more livestreams, wherein the user device is configured to:
receive one or more video program streams from the one or more video provider servers, the video program servers configured to receive the one or more video program streams from one or more third-party application program interfaces of at least one of the one or more third-party service providers or the one or more third-party content providers, the one or more video program streams associated with one or more video programs;
display at least one video program of the one or more video programs on a graphical user interface of the user device;
display an interactive betting content overlay over the displayed at least one video program, the interactive betting content overlay including a list of one or more betting opportunity types on a graphical user interface of the user device;
display a repeatable interactive betting overlay over the displayed at least one video program in response to a user selection of at least one of one or more betting opportunity types from the list of one or more betting opportunity types, the repeatable interactive betting overlay configured to display one or more bets associated with a repeatable bet, the repeatable bet including a bet able to be made multiple times in a row during the displayed at least one video program stream, the repeatable interactive betting overlay further configured to display one or more wagering amounts corresponding to the one or more bets; and
generate one or more control signals configured to lock-in the one or more bets with a third-party service provider in response to a user selection of the one or more bets and the one or more wagering amounts.

12. The system of claim 11, wherein the list of the one or more types of betting opportunity types are updated in near-real time in conjunction with the one or more video programs being displayed.

13. The system of claim 11, wherein the repeatable bet overlay is semi-persistent.

14. The system of claim 11, wherein user device is further configured to:
display a quick return selectable button configured to direct a user to a closed interactive content overlay.

15. The system of claim 11, wherein the user device is configured to associate a first data payload with a first selectable button, and a second data payload with a second selectable button.

16. The system of claim 15,
wherein the user device is configured to display supplemental content of the first data payload in a first interactive content overlay window in response to a user selection of the first selectable button,
wherein the user device is configured to display supplemental content of the second data payload in a second interactive content overlay window in response to a user selection of the second selectable button.

17. The system of claim 16, wherein at least one of the first interactive content overlay window or the second interactive content overlay window is at least partially transparent.

18. The system of claim 11, wherein the user device is further configured to:
receive one or more signals indicating a specified event has occurred;
identify the user device as being subscribed to a livestream associated with the specified event; and
display a notification in the interactive content overlay on the graphical user interface.

19. The system of claim 18, wherein the livestream comprises at least one of:
a fantasy league livestream;
a sporting league livestream; or
a gambling service livestream.

20. A method, comprising:
generating one or more control signals configured to cause a user device displaying a video program to display an interactive betting content overlay over the displayed video program on a user interface, the interactive betting content overlay including a list of one or more betting opportunity types, wherein the user device is communicatively coupled to one or more video provider servers and at least one of one or more third-party service providers or one or more third-party content providers, wherein the user device is subscribed to a specific Event ID, wherein the specific Event ID corresponds to the one or more livestreams;
generating one or more control signals configured to cause the user device displaying the video program to display a repeatable bet overlay over the displayed video program in response to a user selection of at least one of one or more betting opportunity types from the list of one or more betting opportunity types, the repeatable bet overlay configured to display one or more bets associated with a repeatable bet, the repeatable bet including a bet able to be made multiple times in a row during the displayed at least one video program stream, the repeatable bet overlay further configured to display one or more wagering amounts corresponding to the one or more bets; and
generating one or more control signals configured to lock-in the one or more bets with the third-party service provider in response to a user selection of the one or more bets and the one or more wagering amounts.

* * * * *